US012612246B1

(12) United States Patent
Sit

(10) Patent No.: US 12,612,246 B1
(45) Date of Patent: Apr. 28, 2026

(54) TRASH CAN WITH INTEGRATED AIR EVACUATION SYSTEM

(71) Applicant: PicClick, Inc, Rancho Santa Fe, CA (US)

(72) Inventor: Ryan Sit, Rancho Santa Fe, CA (US)

(73) Assignee: PicClick, Inc., Rancho Santa Fe, CA (US)

( * ) Notice: Subject to any disclaimer, the term of this patent is extended or adjusted under 35 U.S.C. 154(b) by 0 days.

(21) Appl. No.: 19/296,860

(22) Filed: Aug. 11, 2025

Related U.S. Application Data

(60) Provisional application No. 63/803,014, filed on May 9, 2025.

(51) Int. Cl.
*B65F 1/06* (2006.01)

(52) U.S. Cl.
CPC ........ *B65F 1/065* (2013.01); *B65F 2210/128* (2013.01); *B65F 2210/167* (2013.01); *B65F 2210/168* (2013.01); *B65F 2210/172* (2013.01); *B65F 2210/179* (2013.01); *B65F 2210/181* (2013.01)

(58) Field of Classification Search
CPC ................ B65F 1/065; B65F 2210/128; B65F 2210/167; B65F 2210/168; B65F 2210/172; B65F 2210/179; B65F 2210/181
USPC .......................................................... 340/540
See application file for complete search history.

(56) References Cited

U.S. PATENT DOCUMENTS 7,273,155 B1 * 9/2007 Gray ....................... B65F 1/065 220/8
10,994,926 B2 5/2021 Eiler
2003/0136279 A1 7/2003 Tarlow
2004/0206760 A1 * 10/2004 Gagnebin ................. B65F 1/08 220/495.04
2006/0175336 A1 * 8/2006 Wang ...................... B65F 1/163 220/495.04

(Continued)

FOREIGN PATENT DOCUMENTS

CN 205855077 1/2017
CN 207536530 6/2018

(Continued)

OTHER PUBLICATIONS

International Search Report dated Dec. 22, 2025 for PCT/US2025/041554. (20 Pages).

*Primary Examiner* — Kerri L McNally
(74) *Attorney, Agent, or Firm* — Manuel de la Cerra

(57) ABSTRACT

A trash can assembly includes a trash can having an interior space and a vacuum assembly. The vacuum assembly comprises a top surface forming a false bottom, an elevated portion with a vacuum vent, a liquid gutter surrounding the elevated portion, and a plenum housing a vacuum motor. The vacuum motor is configured to draw air through the vacuum vent into the plenum, causing a trash bag to conform to the interior surface of the trash can. The assembly may include a controller, power source, charger port, seal indicator, status indicator, wireless control switch, and may operate in reverse mode for bag inflation or demonstration. The trash can may nest into an outer container formed of a rigid material including plastics or metals suitable for consumer waste receptacles, and connect electrically via detachable connectors. The system enhances bag capacity, aesthetics, and operational convenience.

29 Claims, 16 Drawing Sheets

(56) References Cited

U.S. PATENT DOCUMENTS

| | | | | |
|---|---|---|---|---|
| 2009/0095755 | A1 | 4/2009 | McCurry | |
| 2011/0100997 | A1* | 5/2011 | Gagnebin | B65F 1/06 220/495.04 |
| 2013/0306639 | A1* | 11/2013 | Kastner | B65F 1/068 220/745 |
| 2016/0083183 | A1* | 3/2016 | Tatom | B65F 1/065 220/495.04 |
| 2020/0017292 | A1* | 1/2020 | Eiler | B65F 1/065 |
| 2020/0339344 | A1 | 10/2020 | Wang et al. | |
| 2022/0161995 | A1* | 5/2022 | Li | B65F 1/062 |
| 2023/0331472 | A1* | 10/2023 | Zhu | B65F 1/16 |

FOREIGN PATENT DOCUMENTS

| | | |
|---|---|---|
| CN | 109319331 | 2/2019 |
| CN | 210619149 | 5/2020 |
| CN | 114933108 | 8/2020 |
| CN | 213949514 | 8/2021 |
| CN | 113353512 | 9/2021 |
| CN | 114104560 | 3/2022 |
| CN | 114212411 | 3/2022 |
| CN | 216685844 | 6/2022 |
| WO | 2024/0158956 | 8/2024 |

* cited by examiner (Line A-A)

(First Mode)

(Second Mode)

TRASH CAN WITH INTEGRATED AIR EVACUATION SYSTEM

CROSS-REFERENCE TO RELATED APPLICATIONS

This application claims priority from U.S. Provisional Application Ser. No. 63/803,014 filed on May 9, 2025, which is incorporated herein by reference in its entirety.

TECHNICAL FIELD

The present disclosure relates to waste receptacles and waste management systems. More specifically, it pertains to a trash can with an integrated vacuum assembly for evacuating air from between a trash bag and the interior walls of the can to enhance space efficiency, improve user experience, and reduce bag consumption.

BACKGROUND

Waste management is an integral part of daily life in homes, offices, and public spaces. Trash cans serve as the primary receptacles for collecting and temporarily storing waste materials before disposal. Traditional trash cans typically consist of a container with an open top, often used in conjunction with disposable plastic bags to facilitate easy removal and disposal of waste.

One common issue encountered with conventional trash cans is the tendency for air to become trapped between the container walls and the plastic bag liner. This trapped air can cause the bag to billow or puff up, reducing the effective capacity of the trash can and potentially making it difficult to properly close the lid. Users often attempt to address this problem by manually pressing down on the bag to expel excess air, which can be inconvenient and not always effective.

The presence of trapped air can also lead to inefficient use of space within the trash can, as items may not settle properly against the container walls. This can result in premature filling of the trash can, necessitating more frequent bag changes and potentially increasing plastic waste. Additionally, the billowing effect can create an unsightly appearance and may interfere with the proper closure of trash can lids, potentially leading to odor issues or attracting pests.

SUMMARY

The present disclosure provides a trash can with an integrated vacuum assembly comprising a top surface forming a false bottom with an elevated portion, a vacuum vent, and a liquid gutter. A plenum and vacuum motor beneath the top surface evacuate air through the vent. The system may include a controller, battery, charger port, wireless switch, and status indicators. The controller may operate in a first mode to draw air out of the container, and in a second mode to inflate the bag for DEMO mode or installation purposes. Optional features include liquid resistance, detachable electrical connectors, and automatic shutoff via current sensing.

The embodiments described in this summary are merely illustrative examples of various aspects that may be employed. These examples are not intended to limit the scope of the invention, which is defined solely by the claims. Various modifications, alternatives, and additional or different embodiments may be made without departing from the scope of the claims.

BRIEF DESCRIPTION OF THE DRAWINGS

The accompanying drawings, which are incorporated in and constitute part of this specification, illustrate example embodiments and together with the description, explain various principles of the disclosed embodiments. For clarity, simplicity, and flexibility, not all elements, components, or specifications are defined in all drawings. Not all drawings corresponding to specific steps or example embodiments are drawn to scale. Emphasis is instead placed on illustration of the nature, function, and product of the system and method described herein.

Embodiments described herein are exemplary and not restrictive. Embodiments will now be described, by way of examples, with reference to the accompanying drawings, in which.

DETAILED DESCRIPTION OF EXAMPLE EMBODIMENTS

Reference is made herein to specific example embodiments, some of which are illustrated in the accompanying figures. While the subject matter is described in conjunction with these example embodiments, it will be understood that it is not intended to limit the scope of the claims to the configurations or implementations shown and described. To the contrary, it is intended that various alternatives, modifications, and equivalents be encompassed within the scope of the claims as would be apparent to persons of skill in the art.

In the following description, numerous specific details are set forth to provide a thorough understanding of certain example embodiments. However, implementations may be carried out without some or all these specific details. In other instances, process operations known to persons of ordinary skill in the art have not been described in detail so as not to obscure relevant aspects of the disclosed subject matter. Various components, operations, or relationships may be described in the singular for clarity, although multiple instances or variations may be employed in certain embodiments. Similarly, method steps are not necessarily presented in a required order, and some steps may be omitted or rearranged depending on the implementation. Furthermore, descriptions of connections or communications between entities should not be interpreted as requiring a direct or uninterrupted link, unless expressly stated; intermediate components or indirect relationships may be present in many embodiments.

Figure 1A:
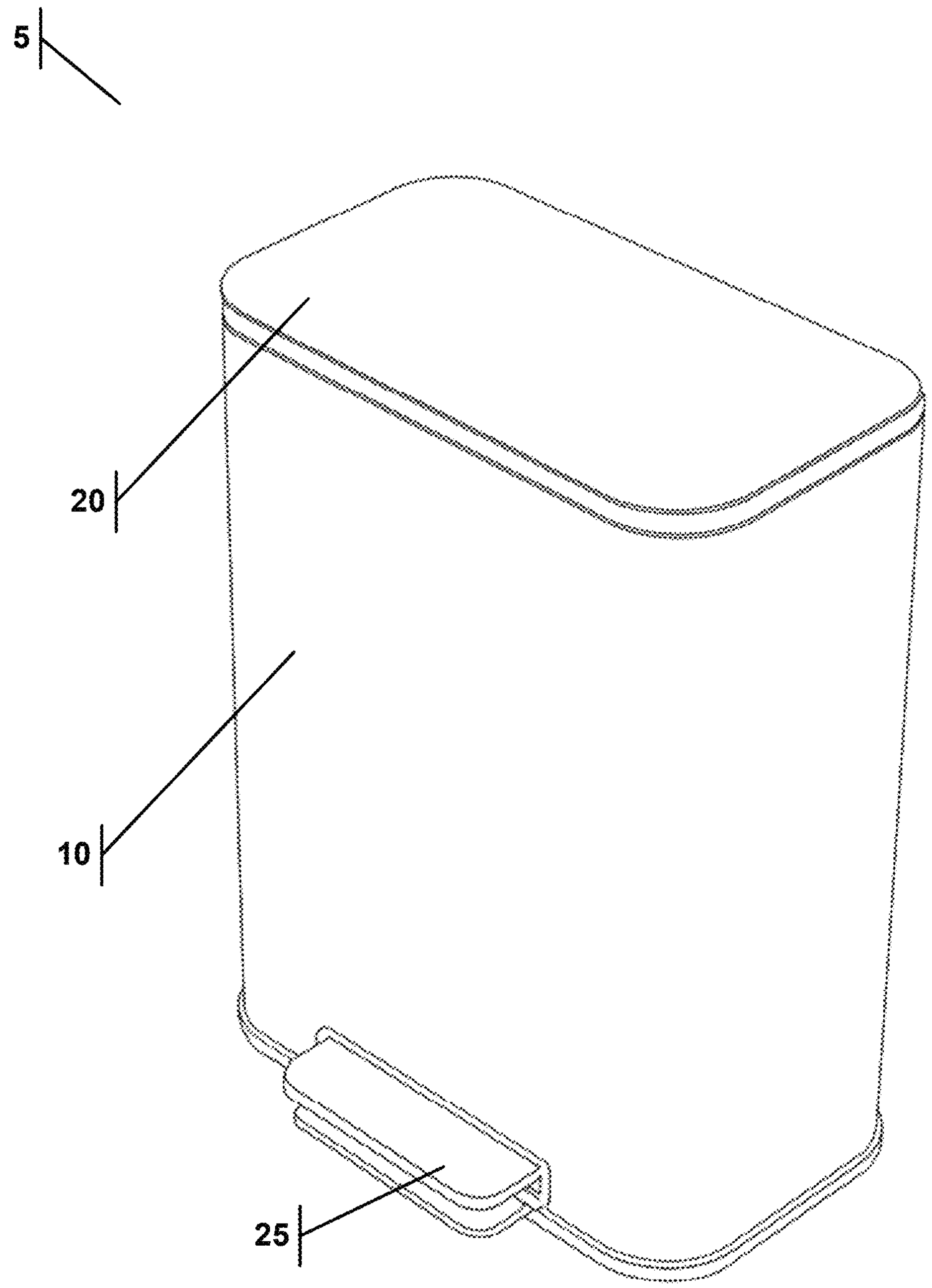
FIG. 1A illustrates an outer container for a trash can (not shown) with a lid and lid pedal.
Figure 1B:
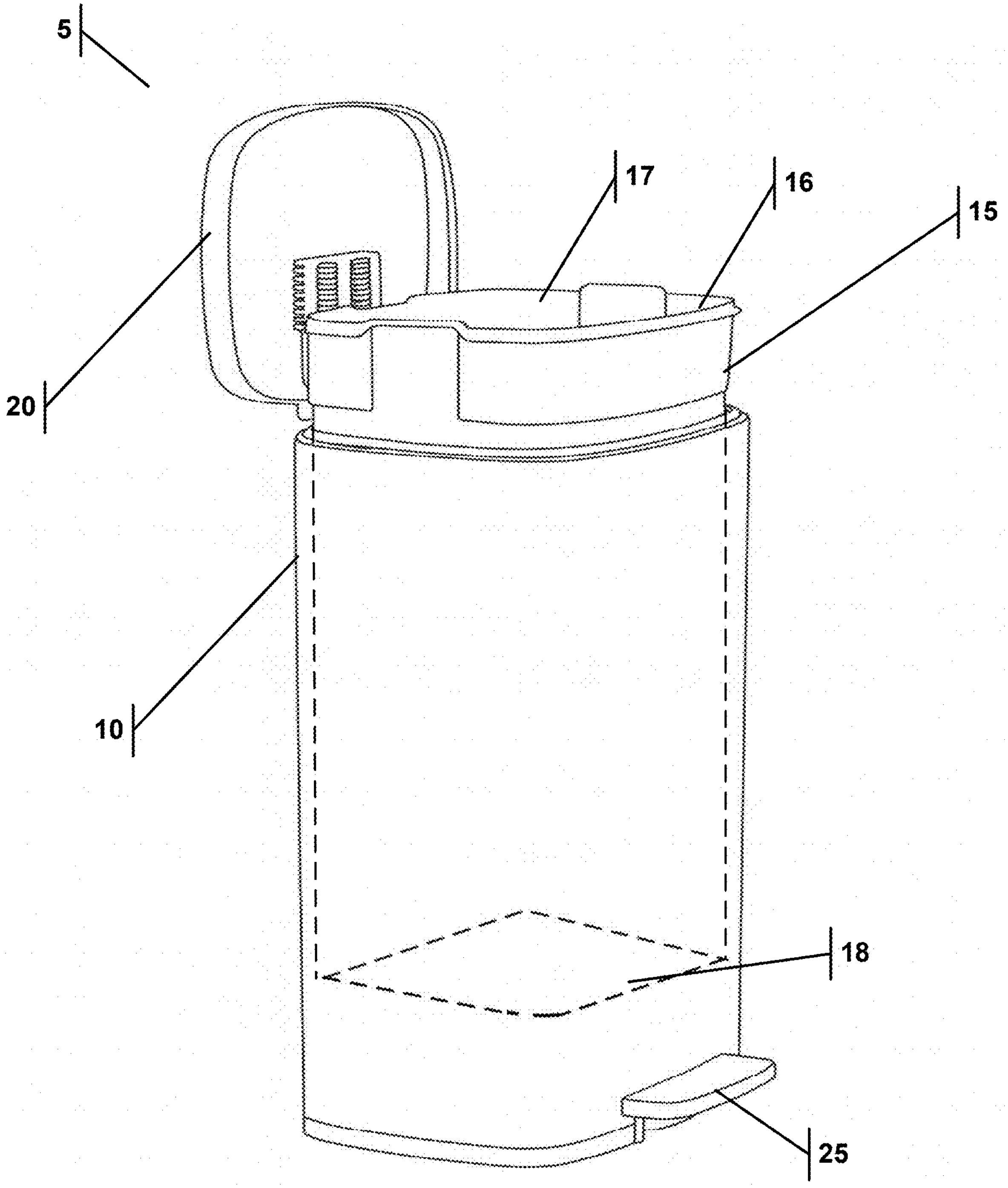
FIG. 1B illustrates the trash can nested into the outer container.

Trash Can Assembly 5
Trash Bag 7
Outer Container 10
Trash Can 15
Rim 16
Opening 17
Bottom Surface 18
Lid 20
Lid Pedal 25
Positioning for Vacuum Assembly 30
Vacuum Assembly 35
Self-Contained Vacuum Assembly 35A
Top Surface 37
Liquid Gutter 40
Moisture Sensor 41
Plenum 42
Sound Isolating Enclosure 43
Drainage Pump 44
Vacuum Vent 45
Elevated Portion 47
Seal Indicator (e.g. Embossed or Printed) 50
Status Indicator (e.g. LED or Speaker) 55
Failsafe Button 57
Vacuum Motor 60
Port 65
Side Exterior Exhaust Outlet 67
Bottom Exterior Exhaust Outlet 68
Controller 70
Control Switch 75
Battery 80
Charger Port 85
Detachable Electrical Connector 90A, 90B
Energy Harvesting Device 95
External Processor 100
Blower/Fan 105
Support Insert 110
Exhaust-Controlled Pathways 115
Adaptors 120A, 120B, 120C, 120D Referring now to the drawings, FIG. 1A illustrates a trash can assembly (5) including an outer container (10) with a lid (20) and a lid pedal (25). This outer container (10) is designed to receive a removable inner trash can (15), as shown in FIG. 1B. The trash can (15) includes a rim (16), an opening (17) configured for inserting trash, and a bottom surface (18) which rests above a vacuum assembly (35). A trash bag (7), not shown in FIG. 1B, is typically placed inside the trash can (15) with its opening secured around the rim (16). The trash can (15) may have a volume ranging from about 5 liters to about 100 liters, more preferably from about 10 liters to about 60 liters, and most preferably from about 20 liters to about 40 liters. The dimensions of the trash can (15) may range from about 20 cm to about 100 cm in height, more preferably from about 30 cm to about 80 cm, and most preferably from about 40 cm to about 60 cm.

Figure 2:
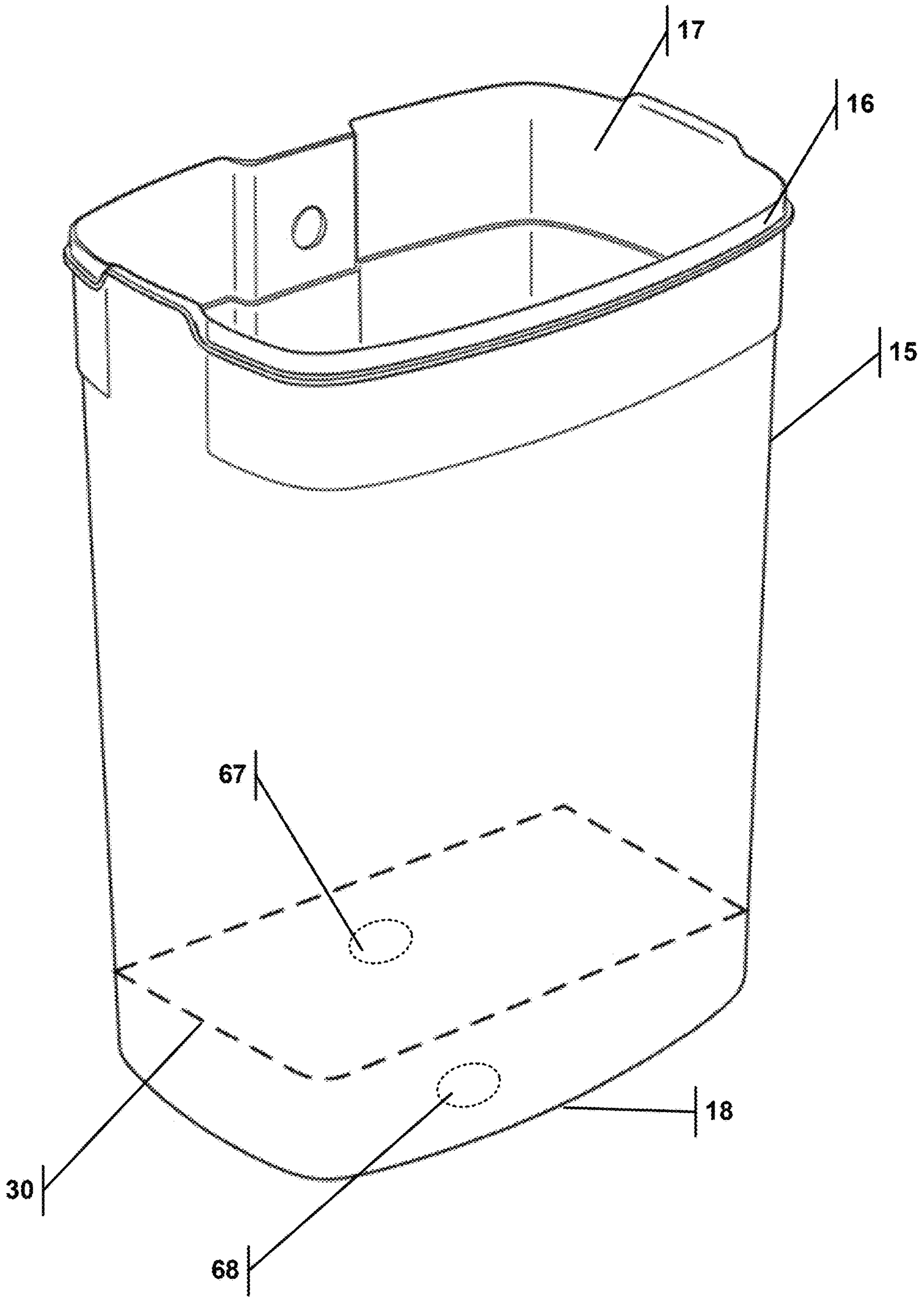
FIG. 2 illustrates the trash can with the relative positioning of the vacuum assembly.

As shown in FIG. 2, the vacuum assembly (35) is positioned near the bottom surface (18) of the trash can (15), at the designated positioning zone (30).

Figure 3A:
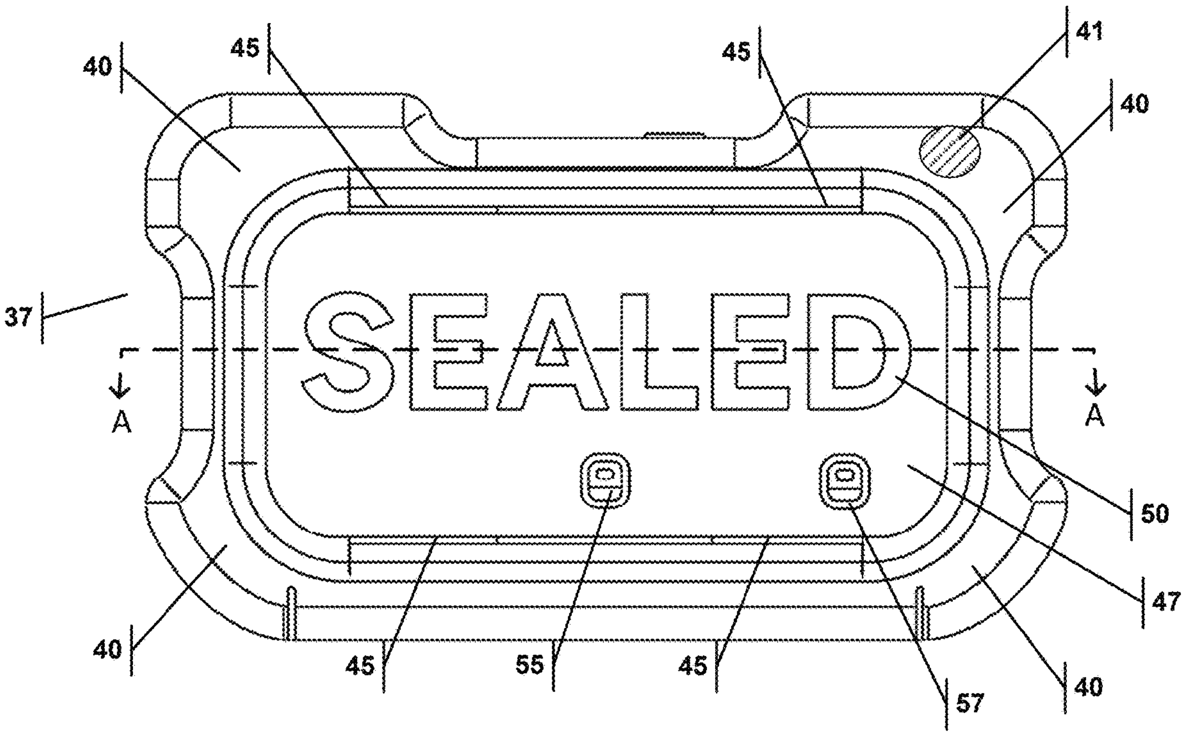
FIG. 3A is a top view of the vacuum assembly, specifically the top surface thereof.
Figure 3B:
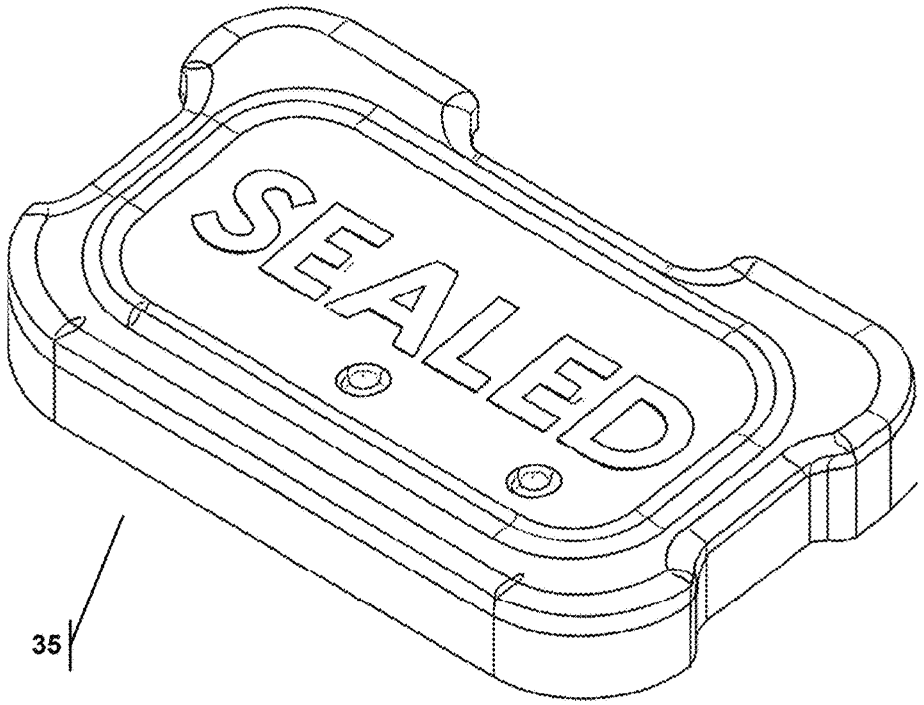
FIG. 3B is an isometric view of the vacuum assembly.

Turning to FIGS. 3A and 3B, the vacuum assembly (35) features a top surface (37) that serves as a false bottom within the trash can (15). The vacuum assembly (35) may be made of a rigid material, including plastics, metals and composites. Plastic materials may include, but are not limited to, high-density polyethylene (HDPE), low-density polyethylene (LDPE), polypropylene (PP), polyvinyl chloride (PVC), polycarbonate (PC), acrylonitrile butadiene styrene (ABS), or polyamide (PA, Nylon). Metal materials may include, but are not limited to, stainless steel, aluminum, galvanized steel, or coated steel. Composite materials may include, but are not limited to, fiber-reinforced plastics, carbon fiber composites, or glass-reinforced plastics.

This top surface (37) includes an elevated portion (47) that provides structural support and defines airflow channels. At least one vacuum vent (45), which may include a hydrophobic PTFE membrane or stainless steel mesh to block liquid ingress, is positioned within the elevated portion (47) to facilitate air intake into the vacuum system. Surrounding the elevated portion is a liquid gutter (40), which functions to catch and pool liquid waste that may escape the trash bag, preventing such fluids from reaching sensitive electrical or airflow components beneath. The liquid gutter (40) may be removable and sloped or otherwise contoured to direct liquid away from the vacuum vent (45), as seen in cross-sectional FIG. 3E, and is configured to hold at least 5 ounces of fluid to reduce the risk of ingress into vacuum-sensitive components. In some implementations, the liquid gutter (40) may be contoured with subtle slopes or ridges to guide liquids toward the perimeter of the trash can (15) and away from the vacuum vents (45), maintaining a visually flat and uniform bottom surface. Alternatively, the liquid gutter (40) may include a series of concentric channels or a labyrinthine path that liquids must traverse before reaching any openings, leveraging surface tension and gravity to trap or redirect fluids while allowing air to flow freely during the evacuation process. These channels or paths may incorporate small dams or overflow points to further impede liquid progress toward sensitive areas. In certain embodiments, hydrophobic or oleophobic coatings may be applied on and around the vacuum vents (45) to repel water and other liquids, enhancing liquid resistance. Additionally, the water protection system may include active elements, such as moisture sensors (41) or automatic sealing mechanisms, which temporarily seal off critical openings or activate a drainage pump (44) to remove accumulated liquids when excessive moisture is detected, particularly in environments prone to significant liquid waste or spills.

FIG. 3A also shows a seal indicator (50), which may be embossed, printed, or otherwise integrated and may be formed of contrasting coloration or material designed for visibility through standard plastic liners into the top surface (37). When air is properly evacuated and the trash bag conforms to the surface, this indicator becomes visible through the bag, confirming correct operation. The seal indicator (50) may include branding or embossed text that becomes visible only when the trash bag conforms fully to the interior of the trash can. This provides both confirmation of proper function and a branding opportunity, adding utility by visually confirming operational success. A status indicator (55), such as an LED light or a speaker, may be integrated into the same region to provide visual or audio feedback during or upon completion of the air evacuation cycle.

The status indicator (55) may also use voice or sound to indicate conditions such as low power or to provide a startup tutorial for first-time users to guide them through the operation of the trash can assembly (5). In some aspects, the trash can assembly (5) may incorporate an audio feedback system designed to enhance user experience and provide clear indication of the air evacuation process completion. This audio feature may serve multiple purposes, including functional notification, brand reinforcement, and positive psychological reinforcement for the user.

Also shown in FIG. 3A is a failsafe button (57) that may be used to diagnose problems with the trash can assembly (5). For example, pressing the failsafe button (57) may allow the user to verify that the vacuum motor (60) is operational and whether the wireless control switch (75) is connected or has a low battery. These diagnostic results may be reported via the status indicator (55).

The audio feedback system may be engineered to produce a distinct sound upon successful completion of the air evacuation or "unpoofing" process. This sound may be carefully crafted to be both attention-grabbing and pleasant, avoiding harsh or startling tones that could be disruptive in quiet environments. In some implementations, the sound may be a short, melodic chime or a subtle, satisfying "whoosh" that mimics the sound of air being fully evacuated.

In certain aspects, the device may utilize the brand name "UnPoof" as part of its audio feedback. For example, the device might play a brief jingle followed by a voice saying "UnPoof complete" or simply an audio logo that phonetically resembles "UnPoof" without using actual words. This approach may help reinforce brand recognition and create a memorable user experience associated with the product's core functionality.

The audio system may be designed with adjustable volume levels to suit various environments and user preferences. In some implementations, users may be able to choose from a selection of different sounds or even customize the audio feedback with their own preferred tones or messages. This customization option may be accessible through a companion smartphone app or through the device's control interface.

To enhance the psychological impact of the audio feedback, the sound may be designed based on principles of psychoacoustics and user experience design. The tone, pitch, and duration of the sound may be optimized to evoke a sense of satisfaction and accomplishment. This positive reinforcement may help users associate the act of properly evacuating air from their trash bags with a pleasant experience, potentially encouraging more consistent use of the feature.

In some aspects, the audio feedback may be coupled with visual cues for a multi-sensory indication of process completion. For instance, the sound may be synchronized with a brief LED light display or a subtle vibration of the container, creating a more immersive and noticeable signal that the task is complete.

The assembly may employ advanced audio processing techniques to ensure that the feedback sound is clear and discernible even in noisy environments. This may include adaptive volume control that adjusts based on ambient noise levels, or the use of directional speakers that focus the sound towards the most likely location of the user.

For users with hearing impairments, the device may offer alternative feedback methods that can be used in conjunction with or instead of the audio signal. These may include more pronounced visual cues, haptic feedback through the wireless control button, or even smartphone notifications for connected devices.

In some implementations, the audio system may be expanded to provide additional informational cues throughout the air evacuation process. For example, it might offer a different tone to indicate the start of the process, a series of progressive sounds to indicate the level of evacuation achieved, or specific alerts for any issues encountered during operation.

The audio feedback feature may also be integrated with the device's demonstration mode. In retail settings, the completion sound may be emphasized or elaborated upon to draw attention to the successful operation of the device. This audio demonstration may be synchronized with the visual display of the bag deflating, creating a compelling multi-sensory showcase of the product's capabilities.

In some embodiments, the vacuum assembly (35) may incorporate alternative designs to facilitate air evacuation without requiring perforations. For instance, as shown in FIG. 3F, the vacuum assembly (35) may feature a series of vacuum vents (45) configured as slits (shaded) within the top surface (37), which may be arranged vertically or horizontally along the length of the assembly. These slits may vary in width, length, and arrangement to optimize air evacuation from different regions of the trash can (15). The slits may also be positioned along the perimeter of the top surface (37), promoting uniform flattening of the trash bag (7) and reducing the tendency for the central portion of the bag to sag or block centrally located evacuation holes. In certain implementations, a perimeter evacuation system may include a series of narrow slits arranged around the entire circumference of the base of the trash can (15), oriented vertically or at an angle to direct airflow from the edges toward the center of the container. The combination of perimeter placement and minimized perforations provides both an improved aesthetic (clean, flat appearance with minimal visible openings) and enhanced functional performance (uniform airflow with fewer perforations), contributing to the novelty of this assembly. This arrangement of perimeter slits provides a clean, flat bag appearance with minimal visible openings, while reducing the number of perforations required to achieve effective airflow.

Figure 3C:
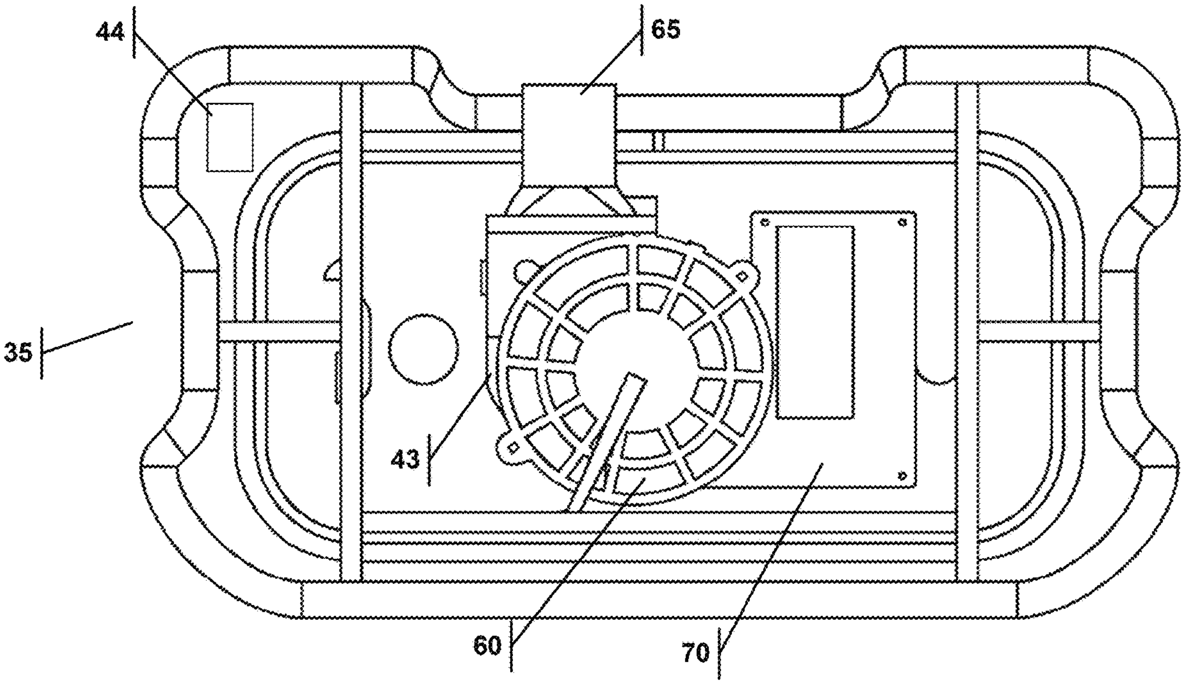
FIG. 3C is a bottom view of the vacuum assembly, specifically illustrating the plenum and vacuum motor.
Figure 3D:
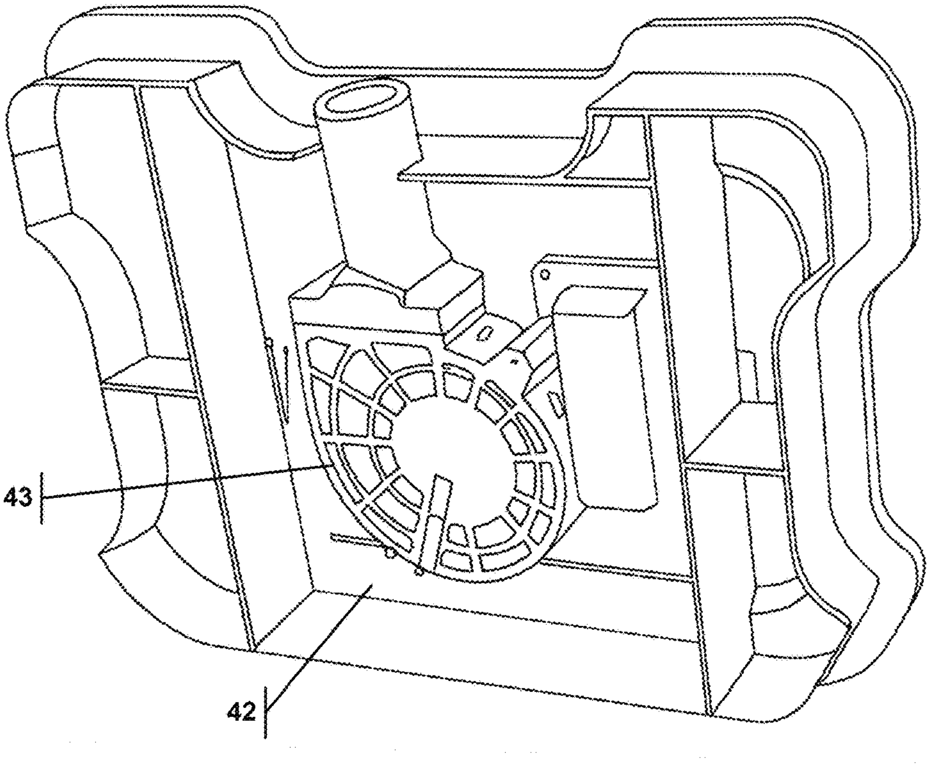
FIG. 3D is an isometric bottom view of the vacuum assembly, specifically illustrating the plenum and vacuum motor.
Figure 3E:
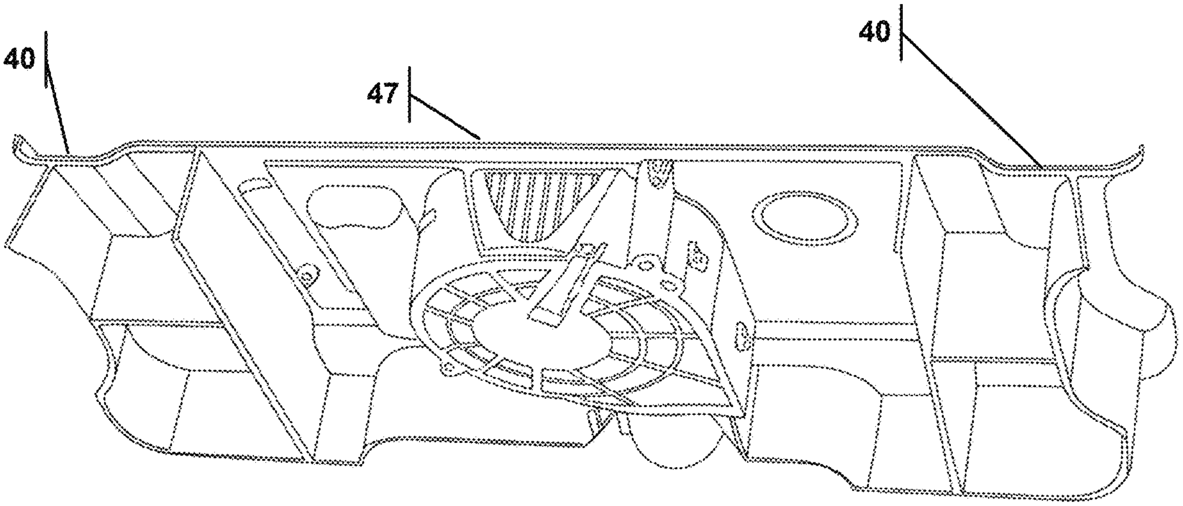
FIG. 3E is a cross-sectional view of the vacuum assembly, specifically illustrating the shape of the elevated surface and liquid gutter of the top surface.
Figure 3F:
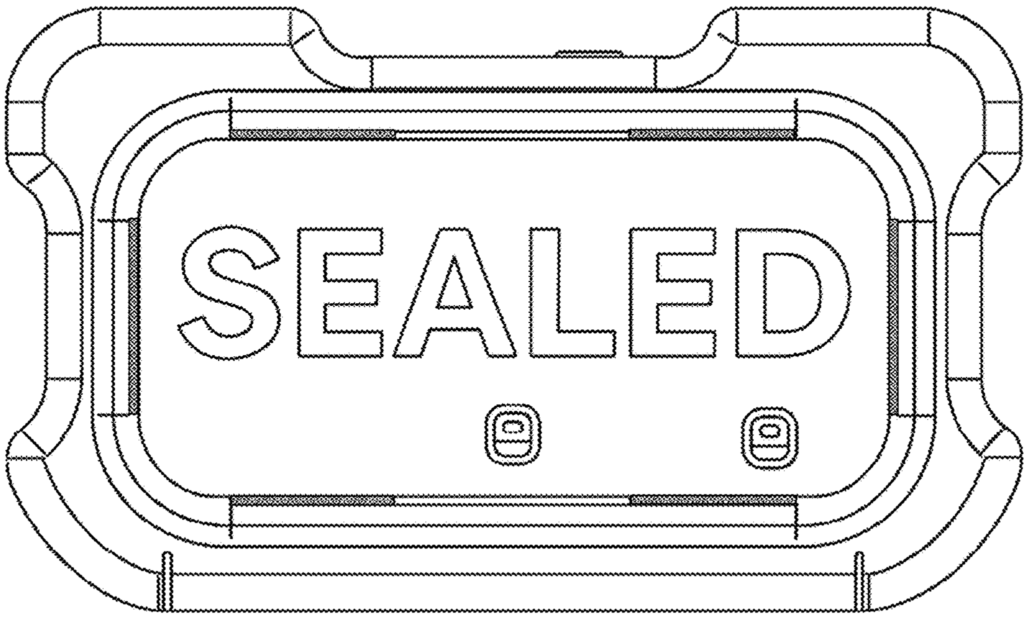
FIG. 3F illustrates a slit/perimeter variant of the vacuum vents.

The vacuum assembly (35) further includes, as shown in FIGS. 3C and 3D, a vacuum motor (60) enclosed in a sound isolating enclosure (43) and located within the plenum (42).

Figure 6:
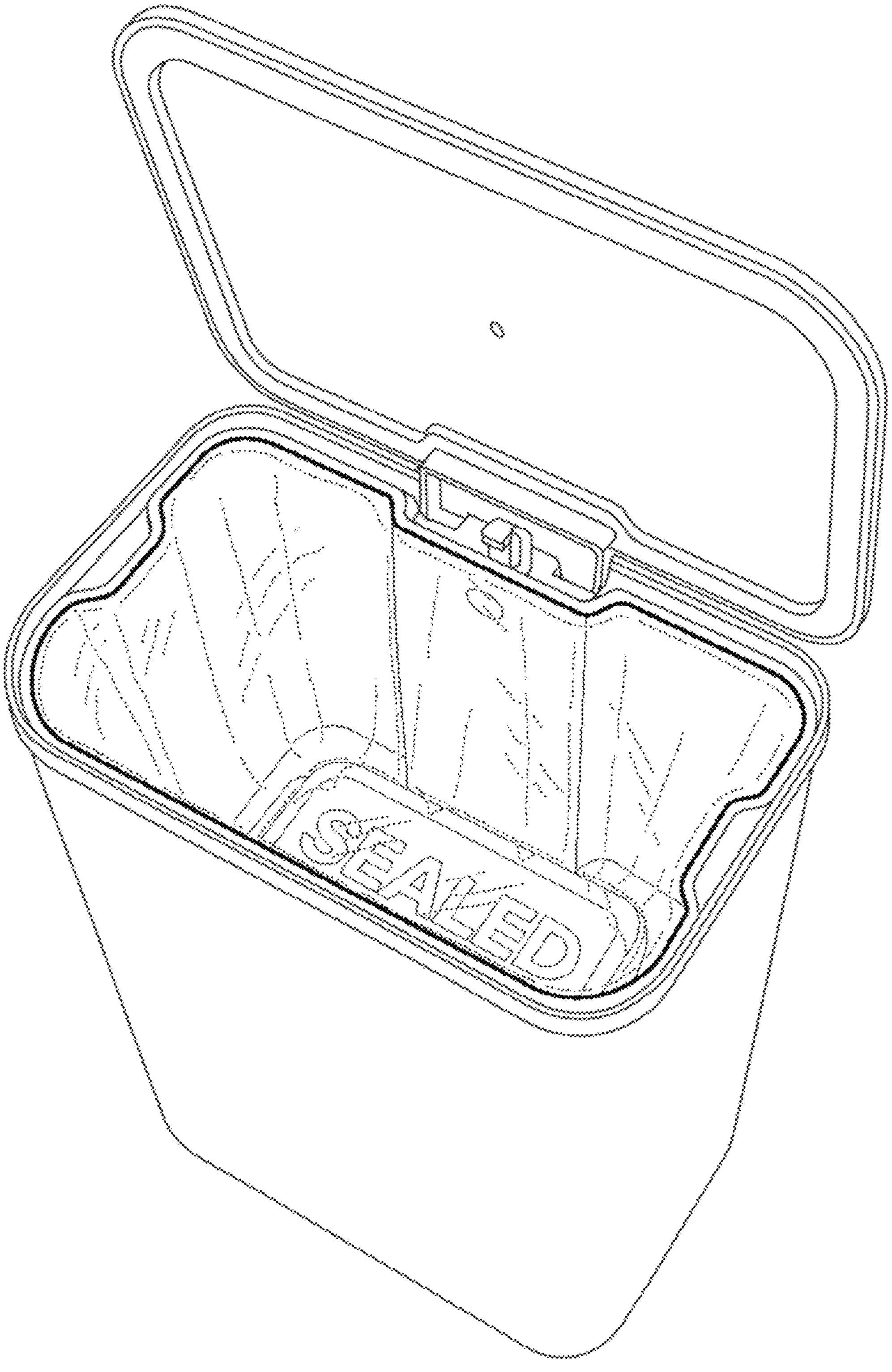
FIG. 6 illustrates the trash can assembly in a first mode where air is evacuated from the plenum, causing the trash bag to conform to the interior shape of the trash can.

The vacuum motor is configured to generate negative pressure that draws air through the vacuum vent (45), which may include a hydrophobic polytetrafluoroethylene (PTFE) membrane or stainless steel mesh to block liquid ingress, and into the plenum, then expels it through the port (65) and out of the container via the exterior exhaust outlet (67). This creates a differential pressure between the inside and outside of the trash bag (7), forcing the bag to collapse against the interior walls of the trash can (15) as shown in FIG. 6, thereby eliminating trapped air, maximizing usable volume, and improving the aesthetic appearance of the bag within the can. The plenum (42) may be divided into multiple zones, each corresponding to a specific area under the top surface (37). The controller (70) may selectively activate different vacuum motors (60) in different zones, optimizing air removal based on the contents or fill level of the trash bag. The vacuum motor (60) may achieve a negative pressure ranging from about −0.01 bar to about −0.5 bar, more preferably from about −0.05 bar to about −0.3 bar, and most preferably from about −0.1 bar to about −0.2 bar, relative to atmospheric pressure.

To optimize the efficiency of the air evacuation process, the trash can assembly may incorporate enhanced sealing mechanisms at critical junctions. Specifically, the rim (16) of the trash can (15) may feature a rubber or elastomeric gasket that creates an airtight seal when the lid (20) is closed. This rubber rim may be implemented as a removable component for cleaning or as an integrated feature. The sealing mechanism may utilize various profiles, such as D-shaped, bulb-type, or foam gaskets, selected based on the specific lid design and required compression force. The rubber sealing mechanism may be complemented by mechanical latches or magnetic closures that ensure consistent pressure is maintained around the perimeter of the container opening. In some implementations, the rubber seal may incorporate antimicrobial properties or odor-neutralizing compounds to enhance the overall waste management experience. The sealing system may also include channels or recesses designed to capture any liquid that might otherwise compromise the integrity of the seal.

In some embodiments, the vacuum motor (60) comprises a centrifugal blower fan selected for its optimal combination of suction and airflow speed, offering a balance between axial fans and traditional vacuum pumps. The centrifugal blower operates by drawing air into the center of its impeller and expelling it at a 90-degree angle through centrifugal force, creating a focused and powerful airflow pattern that efficiently evacuates air from between the trash bag (7) and the trash can (15). The centrifugal blower may be configured in various arrangements, such as backwards-curved, forward-curved, or inline, each offering distinct performance characteristics regarding noise level, efficiency, and air displacement volume. The exhaust configuration of the centrifugal blower may direct air through either the side (position 67, FIG. 2) or bottom (position 68, FIG. 2) of the trash can (15), depending on spatial constraints and efficiency requirements. A side exhaust configuration may integrate with the top surface (37), while a bottom exhaust configuration may enhance stability and reduce the overall height profile of the trash can assembly (5). Both configurations may incorporate noise reduction features, such as vibration dampening mounts, sound-absorbing materials, or aerodynamically optimized components, to minimize operational noise. In alternative embodiments, other air movement devices, such as axial fans, mixed-flow fans, or piezoelectric air pumps, may be used, with the choice depending on factors like desired airflow rate, noise levels, energy efficiency, and space constraints.

The number of exhaust outlets may range from about 1 to about 100, more preferably from about 5 to about 50, and most preferably from about 10 to about 30. The diameter or width of each air outlet may range from about 0.5 mm to about 10 mm, more preferably from about 1 mm to about 5 mm, and most preferably from about 1.5 mm to about 3 mm. The exhaust outlets may be arranged in various patterns, including, but not limited to, a grid pattern, a linear pattern, a circular pattern, or a random pattern. The specific arrangement may depend on factors such as the desired air flow characteristics, manufacturing considerations, or aesthetic preferences.

Figure 10:
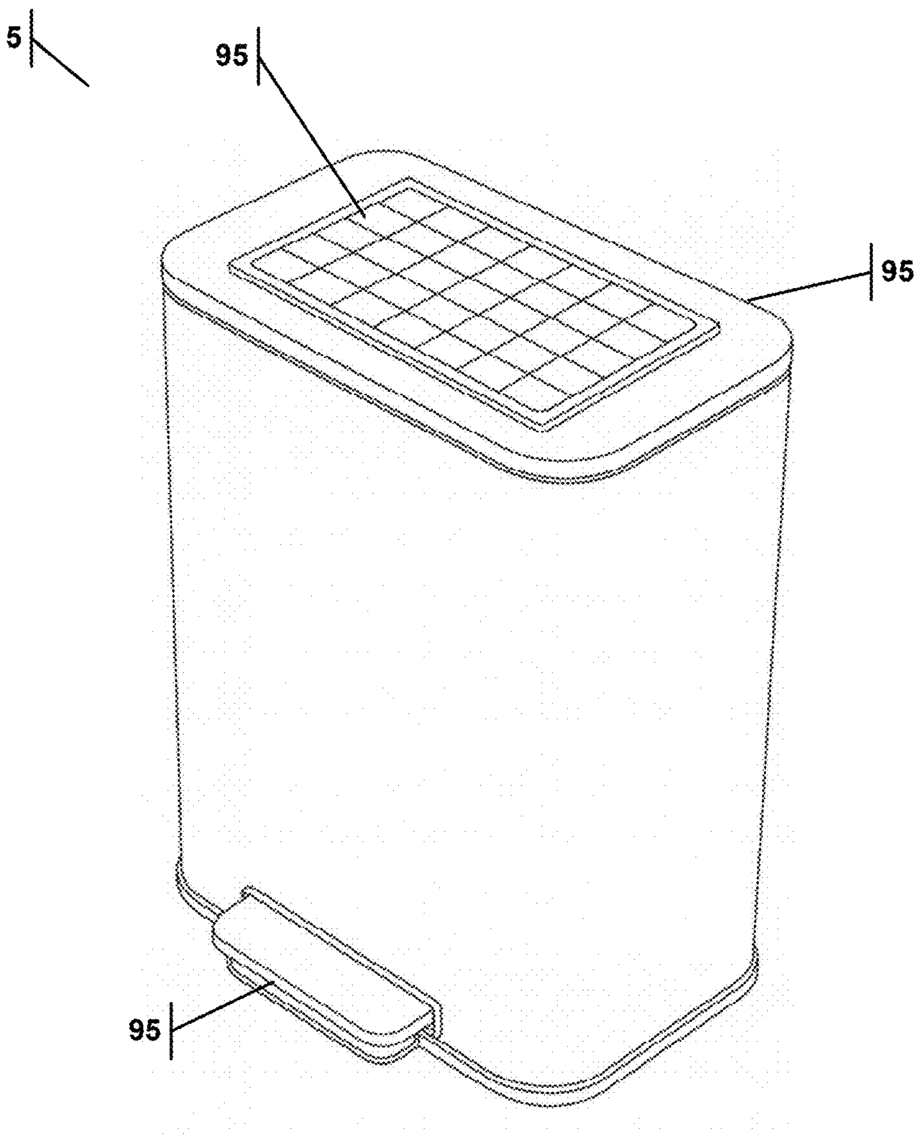
FIG. 10 illustrates various energy harvesting devices used with the trash can assembly.

The vacuum motor (60) or alternative air movement device may provide adjustable vacuum pressure to accommodate different types of trash bags or waste materials, achieved through mechanical controls, electronic settings, or automated systems that sense airflow resistance. In some embodiments, multiple vacuum motors (60) may be employed, operating in series to create a greater pressure differential or in parallel to increase air flow volume, with identical or varying specifications to handle different aspects of the evacuation process. The vacuum motor (60) may be positioned at various locations within the trash can assembly (5), such as near the bottom of the trash can (15), adjacent to the top surface (37), or integrated into the port (65). The positioning of the vacuum motor (60) may be optimized based on factors such as noise reduction, efficiency, maintenance accessibility, and manufacturing considerations. In some implementations, the vacuum motor (60) may be a variable-speed fan, allowing for adjustable suction power to accommodate different types of trash bags or waste materials, with variable speed functionality controlled manually through user interfaces or automatically through sensors that detect resistance to airflow. The vacuum motor (60) may be powered by batteries (replaceable, rechargeable, or integrated with a charging dock), a direct connection to household power, or solar panels integrated into the exterior of the outer container (10). Energy harvesting devices 95 shown in FIG. 10, such as kinetic buttons, hinges, pedals, solar panels, or an inductive charging dock, may also be utilized to power the system, particularly for efficient and infrequent power usage in outdoor settings with sunlight exposure.

Figure 4:
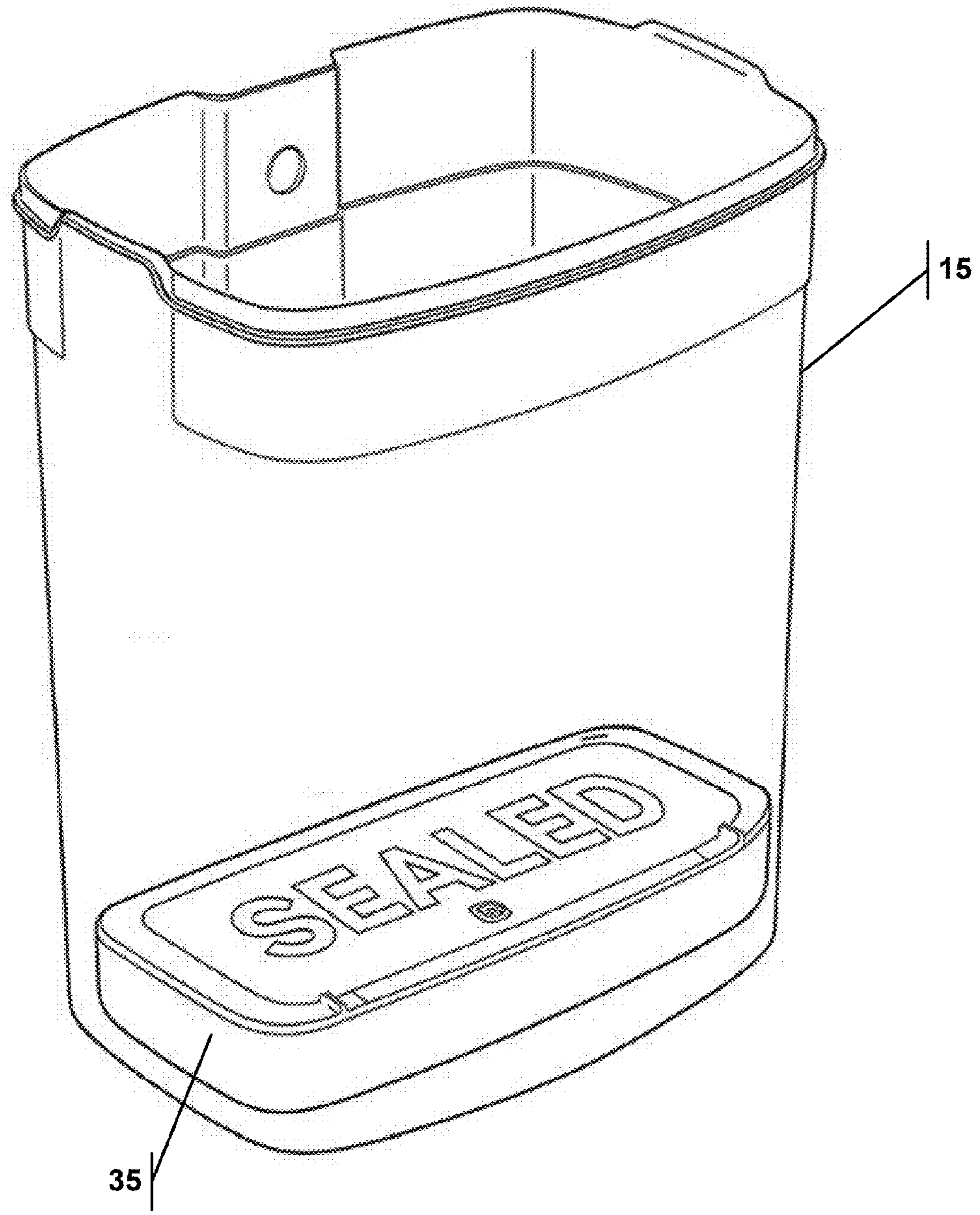
FIG. 4 illustrates the trash can with the vacuum assembly disposed therein.
Figure 5:
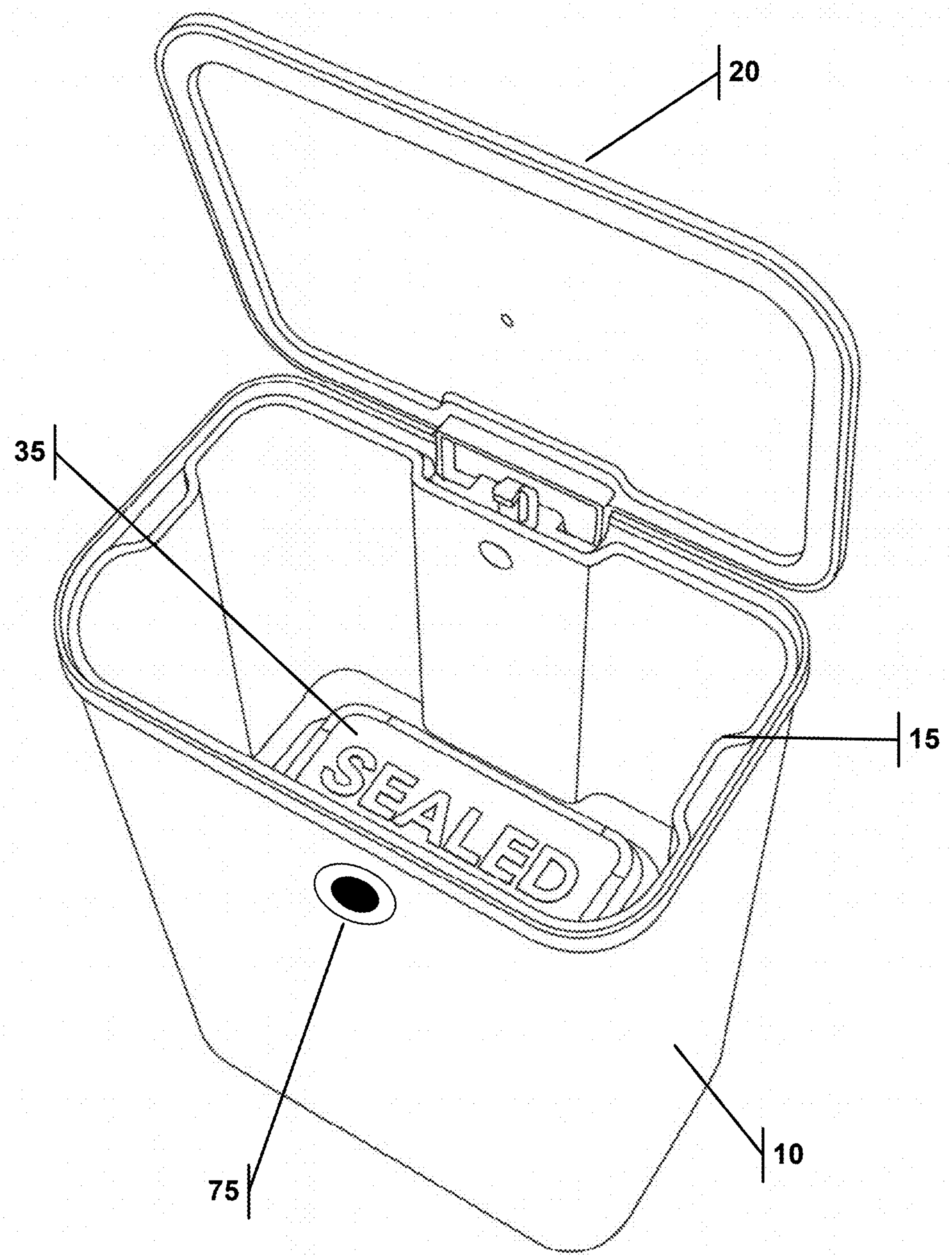
FIG. 5 illustrates the trash can with the vacuum assembly disposed therein, with the trash can nested into the outer container.

FIG. 4 shows the trash can (15) with the vacuum assembly (35) installed in the interior base, and FIG. 5 shows the assembly with the trash can (15) nested into the outer container (10) and the lid (20) open, revealing the visible seal indicator and the control switch (75) positioned on the outer wall. The control switch may be either hardwired or wireless. In the preferred embodiment shown in FIG. 5, the switch (75) is implemented as a wireless control button utilizing a low-power protocol such as BLE (Bluetooth Low Energy), Zigbee, Wi-Fi Direct, or NFC to simplify retrofitting and installation, particularly for existing trash can designs. The wireless control switch (75) may include a long-lasting battery, enabling retrofitting without the need for customized wiring or structural modifications to the trash can (15) or outer container (10), facilitating compatibility with trash cans comprising separable components or multiple sections.

Figure 7:
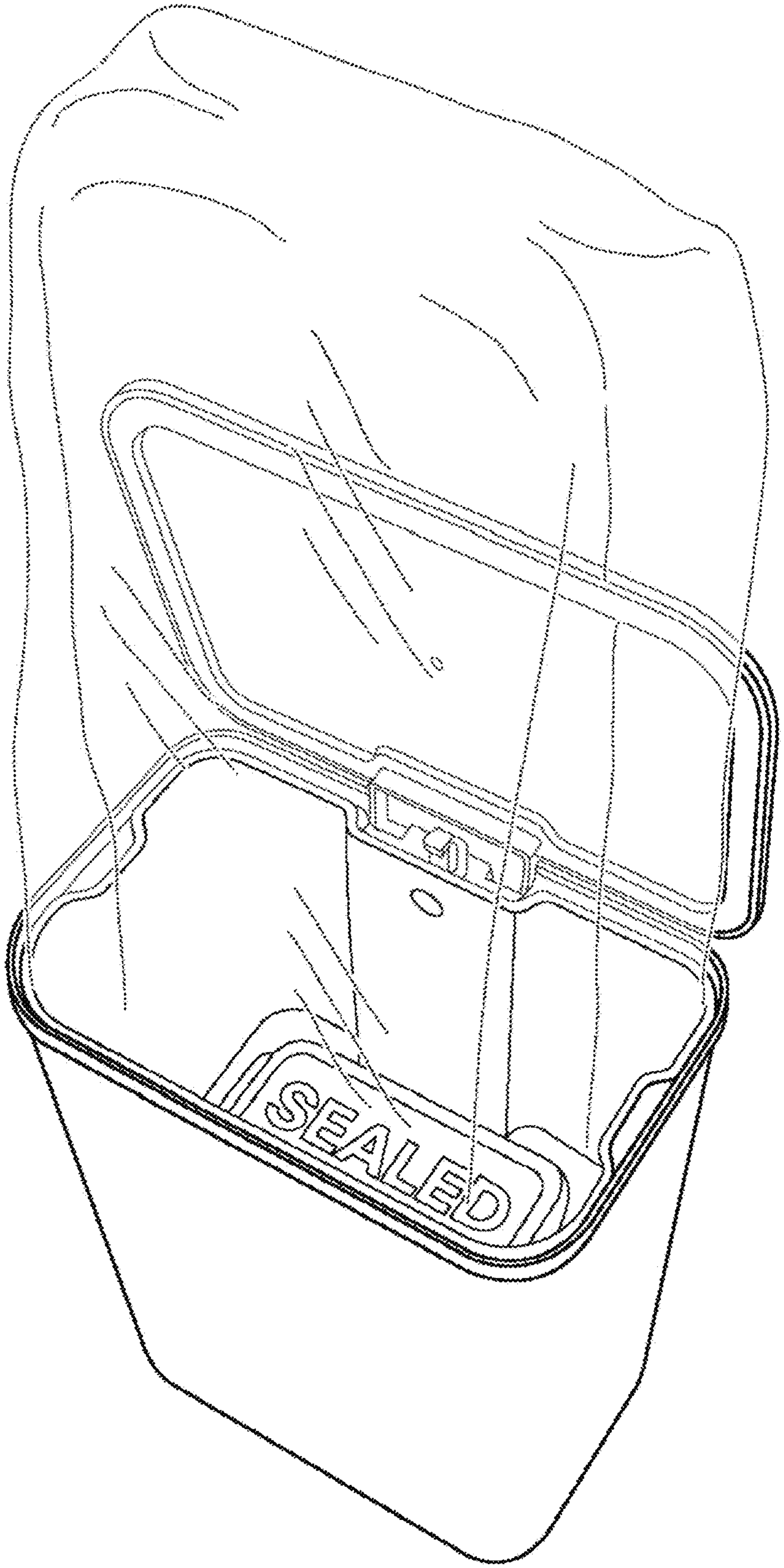
FIG. 7 illustrates the trash can assembly in a second mode where air is forced from the plenum, through the vacuum vent into the interior of the trash bag, causing the trash bag to inflate and exit the interior space.

The system is designed to function in two primary operational modes. In the first mode, as shown in FIG. 6, the controller (70) activates the vacuum motor (60), either manually or automatically, to evacuate air between the trash bag (7) and the inner walls of the trash can (15). In the second mode, illustrated in FIG. 7, the system reverses operation—either via motor polarity switching or a dual-purpose airflow pathway—and introduces positive air pressure into the interior of the trash bag (7), causing it to inflate. This "DEMO mode" is particularly useful for retail demonstration environments or for assisting users in visually confirming the air evacuation feature. In some configurations, the controller (70) alternates between modes for initial inflation followed by air evacuation, ensuring that the trash bag is fully expanded and properly aligned before it is sealed into position against the vacuum assembly (35).

The combination of the demonstration mode and wireless control system may represent a significant advancement in the usability and marketability of the trash can device. The demo mode may effectively showcase the product's unique capabilities, while the wireless control switch may offer unprecedented flexibility in installation and operation, potentially accelerating adoption across a wide range of applications and environments.

These features may collectively enhance the trash can assembly's appeal to both retail customers and commercial clients, offering a compelling demonstration of its benefits and a highly adaptable control solution that can be easily integrated into existing waste management setups. The wireless approach may also provide a strategic advantage by simplifying the retrofit process, potentially allowing for more rapid and widespread adoption of the air evacuation technology across diverse trash can designs and usage scenarios.

Figure 11B:
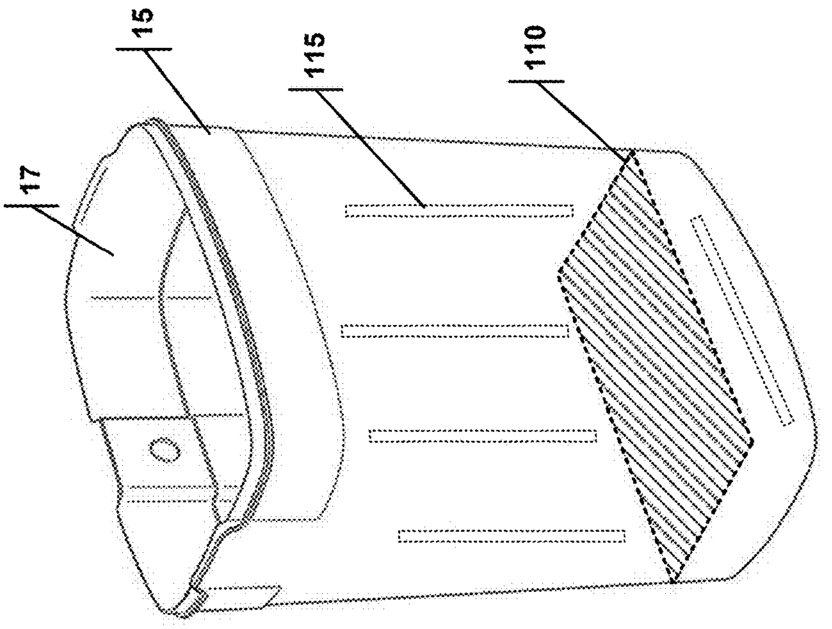
FIG. 11B illustrates the trash can used in the positive pressure embodiment of FIG. 11A.
Figure 11A:
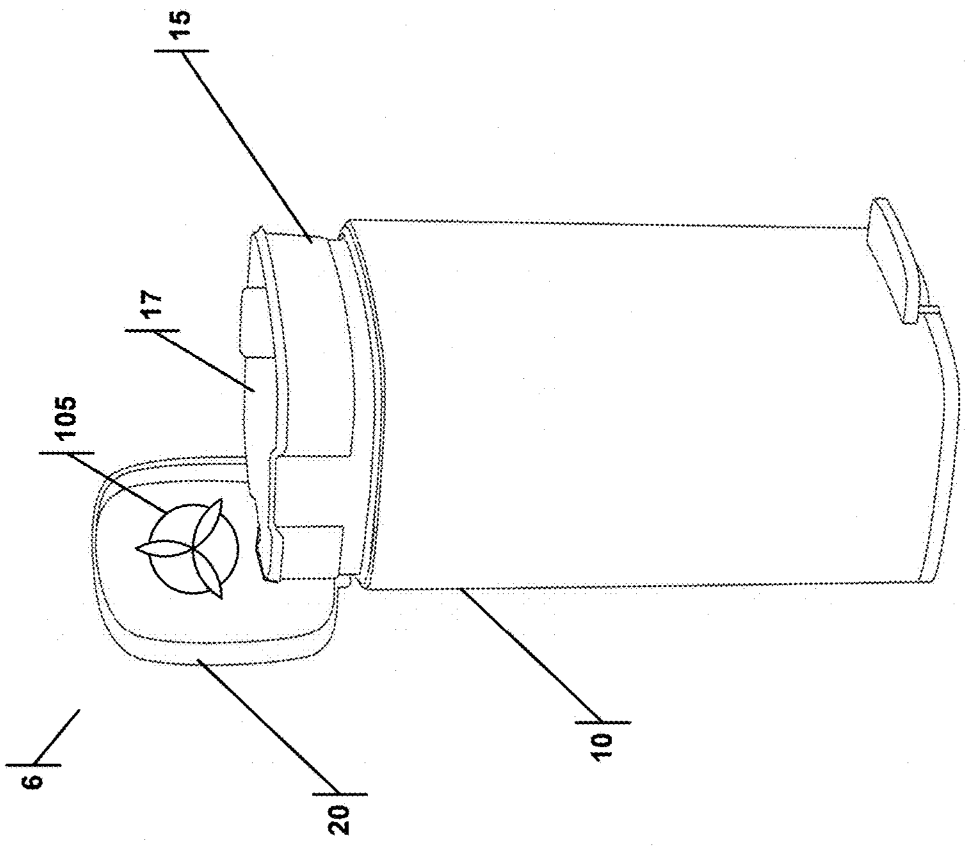
FIG. 11A illustrates the trash can assembly using a positive pressure from a blower/fan in the lid.

In an alternative configuration shown in FIG. 11A, an inverted air flow mechanism may be implemented, whereby a blower/fan (105) is positioned on the lid (20) of the outer container (10) and configured to blow air into the trash bag, creating positive pressure that causes the bag to expand outward and conform to the interior dimensions of the trash can. In this configuration, the lid-mounted blower/fan (105) may draw ambient air through an intake filter and channel it through a distribution manifold into the trash bag. This embodiment may also include an insert (110) that serves as a support structure, preventing the trash bag from fully contacting the inner walls of the trash can (15) while allowing excess air to escape through exhaust-controlled pathways (115). This positive pressure approach may be advantageous for trash bags containing compressible materials or when maintaining bag shape is prioritized. The lid-mounted blower/fan (105) may include a sealed connection point, such as a bayonet-style attachment, threaded coupling, or magnetic seal, that engages with the trash bag opening when the lid (20) is closed, creating a closed air circuit and facilitating easy bag replacement. Pressure relief valves may be incorporated to prevent over-inflation of the trash bag (7), protecting both the bag and the trash can assembly (5) from excessive stress.

Figure 8A:
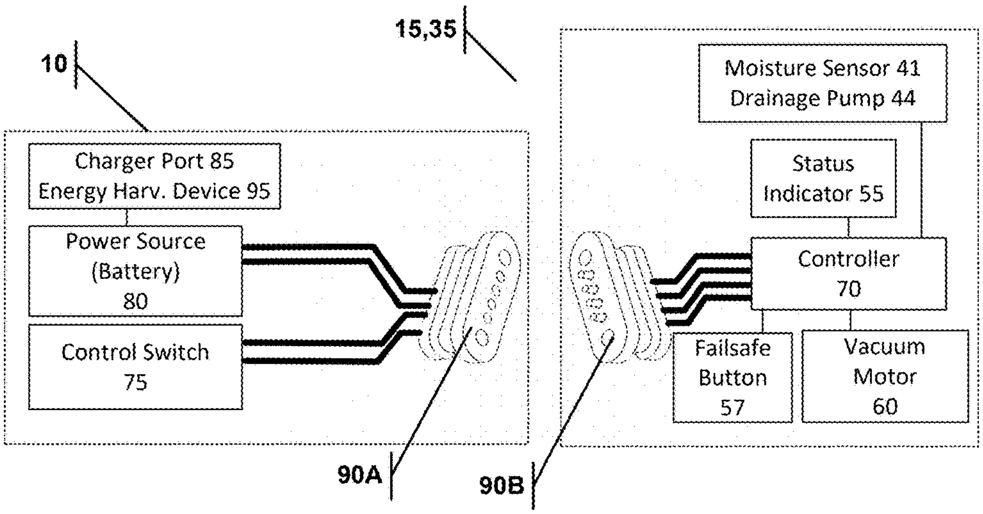
FIG. 8A illustrates a first embodiment of the trash can assembly with a detachable electrical connection between the outer container and the trash can, where certain components are housed in the trash can.
Figure 8B:
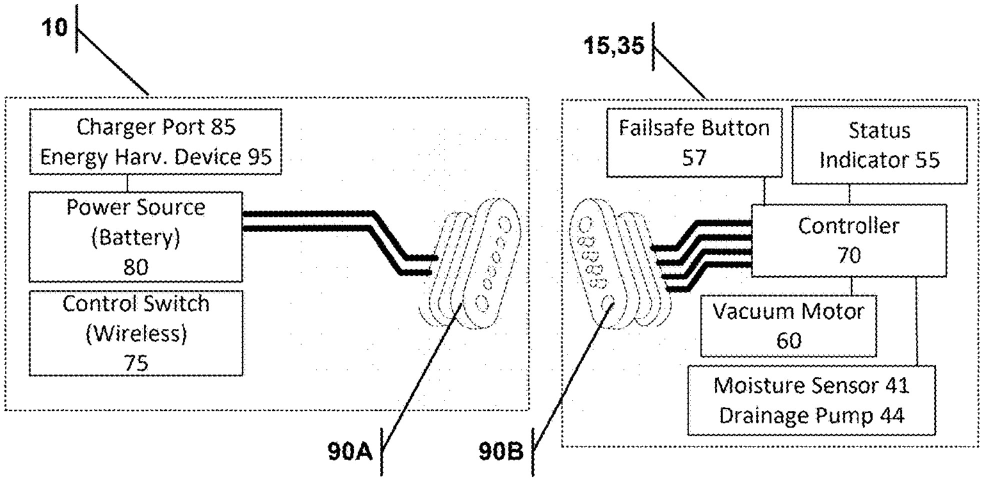
FIG. 8B illustrates a second embodiment of the trash can assembly with a detachable electrical connection between the outer container and the trash can, where certain components are housed in the trash can.
Figure 8C:
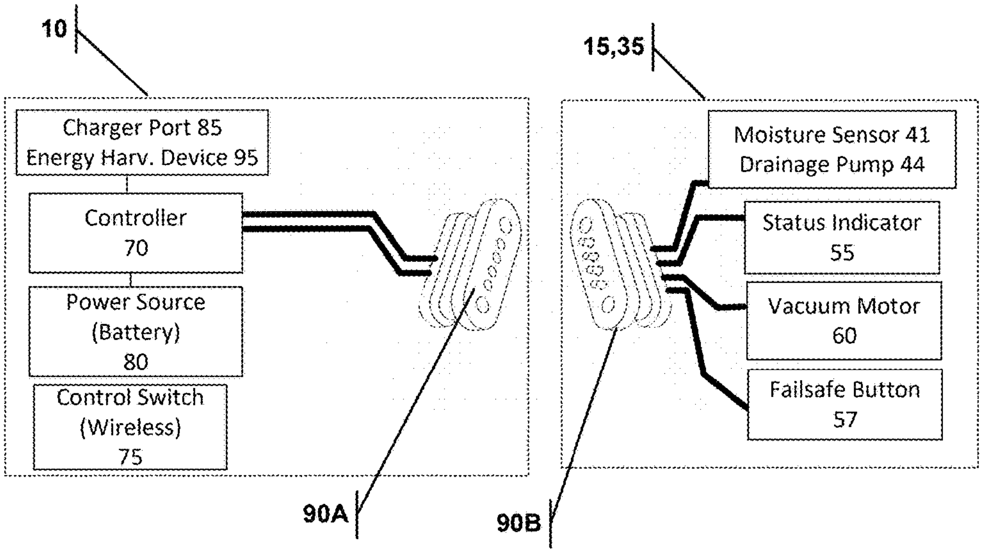
FIG. 8C illustrates a third embodiment of the trash can assembly with a detachable electrical connection between the outer container and the trash can, where certain components are housed in the trash can.

FIGS. 8A-8C illustrate three electrical architecture embodiments for the trash can assembly. In FIG. 8A, the battery (80), control switch (75), charger port (85), and controller (70) are all housed in the outer container (10), and electrically connected to the vacuum assembly (35) within the trash can (15) via a detachable electrical connector (90A, 90B) such as pogo pins, magnetic connectors, or waterproof terminal blocks. The vacuum assembly (35) may include the vacuum motor (60), and the status indicator (55). In FIG. 8B, the configuration is similar, but the control switch (75) is shown as wireless. The control switch (75) can be affixed to the outside of the outer container (10) to allow for easy access to the user. In FIG. 8C, the controller (70) is repositioned to the outer container (10) and electrically coupled back to the vacuum motor (60) and status indicator (55) in the vacuum assembly (35) housed in the trash can (15) via the same pogo pin-based connector system. This modular power and control system allows for flexibility in component placement and facilitates replacement, retrofitting, and servicing without requiring dedicated wiring through the trash can body. The use of pogo pins and pads (90A, 90B) ensures reliable electrical connectivity upon insertion of the trash can (15) into the outer container (10), and detachment when removed.

The vacuum system optionally includes an auto-shutoff feature controlled by the controller (70), which may be implemented by current sensing, pressure differential, or predictive logic based on previous cycles. For instance, the controller (70) may detect when the vacuum motor (60) reaches a predefined amperage threshold, indicating that the trash bag (7) has fully conformed and airflow resistance has increased, prompting termination of operation. Alternatively, the auto-shutoff may be triggered by sensors detecting the trash bag (7) contacting the vacuum assembly (35), sustained high air pressure for a predetermined duration, or increased current draw indicating the vacuum motor (60) is working harder. A backup timer may also be included to terminate operation after a set time. Additionally, a hydrophobic coating or membrane may be applied to the vacuum vent (45), which may include a hydrophobic PTFE membrane or stainless steel mesh to block liquid ingress, protecting the internal vacuum components and enhancing device durability in residential or commercial environments. An optional control system may enhance functionality by automating the air evacuation process and providing user convenience. This control system may include sensors positioned near the top opening (17) or along the inner walls of the trash can (15) to detect the insertion of a new trash bag (7), automatically activating the vacuum motor (60).

The controller (70) may include a user interface, such as buttons, switches, or a touch-sensitive panel integrated into the outer container (10), may allow manual activation, suction strength adjustment, or setting preferences for automatic operation. For example, the display could provide information about trash changing, deodorizing air filter, scent spray, usage data, visual confirmation of actions, order trash bags, or text when the trash is full.

Figure 9:
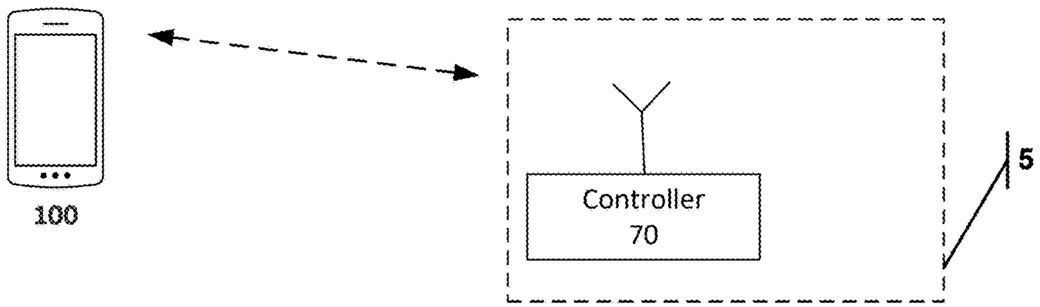
FIG. 9 illustrates the connectivity between the trash can assembly with an external processor.

The control system may include indicators, such as LED lights or a display screen, to communicate the status of the air evacuation process, with different colored lights indicating progress, completion, or issues requiring attention. The control system may offer multiple air evacuation modes for different trash bags or waste materials, with preset or customizable settings. Safety features, such as a timer to limit continuous operation or sensors to detect excessive negative pressure, may prevent overuse or damage. Energy-saving features, such as auto-shutoff after inactivity or a low-power standby mode, may be included. Diagnostic capabilities may monitor performance for early detection of potential issues and facilitate maintenance or troubleshooting. In some cases, the control system may include connectivity features, allowing the trash can assembly (5) to integrate with smart home systems or mobile applications, enabling remote monitoring, customization of settings, or notifications when the trash bag needs to be changed. This is shown in FIG. 9, where the controller (70) is in wireless communication with an external processor (100). The optional control system may be powered by batteries or connected to a household power supply, with some implementations including both options and a battery backup to ensure functionality during power outages.

The trash can assembly (5) may incorporate additional waste management features, such as a built-in odor control system with activated carbon filters, enzymatic treatments, or scent-releasing mechanisms. The vacuum assembly (35) may include interchangeable panels or inserts, allowing users to customize the appearance or functionality of the air evacuation system with different perforation patterns, ornamental designs, or specialized features like odor-absorbing materials or antimicrobial surfaces. This modular approach enables replacement of worn components or updates to functionality without replacing the entire trash can (15). The vacuum assembly (35) may also incorporate noise reduction features, such as vibration dampening mounts, sound-absorbing materials, or aerodynamically optimized components, to minimize operational noise.

This trash can assembly provides an integrated solution to a longstanding waste management problem—air entrapment between trash bags and containers. It offers an aesthetically improved, user-friendly, and sensor-responsive system, with wireless retrofittability and intelligent airflow control. The system can be installed in new products or adapted to existing trash receptacles with minimal structural modification.

In certain embodiments, the trash can assembly (5) is designed to integrate into existing waste receptacle designs with minimal modification, enabling efficient retrofit in manufacturing without requiring development of a custom receptacle body. The assembly (5) may include a self-contained vacuum assembly (35) housing a vacuum motor (60), plenum (42), strategically located vacuum vents (45), a battery (80), controller (70), and related components, along with a separate wireless control switch (75). The absence of wired connections between the control switch (75) and the vacuum assembly (35) allows the system to be incorporated into a wide range of pre-existing receptacle models with only minor adaptations, such as forming an exhaust vent aperture. This arrangement simplifies assembly, reduces tooling changes, allows the vacuum assembly (35) to be installed as a final-stage manufacturing step, and facilitates replacement, cleaning, or upgrading of the vacuum assembly (35) independently from the trash can (15) body.

Figure 12A:
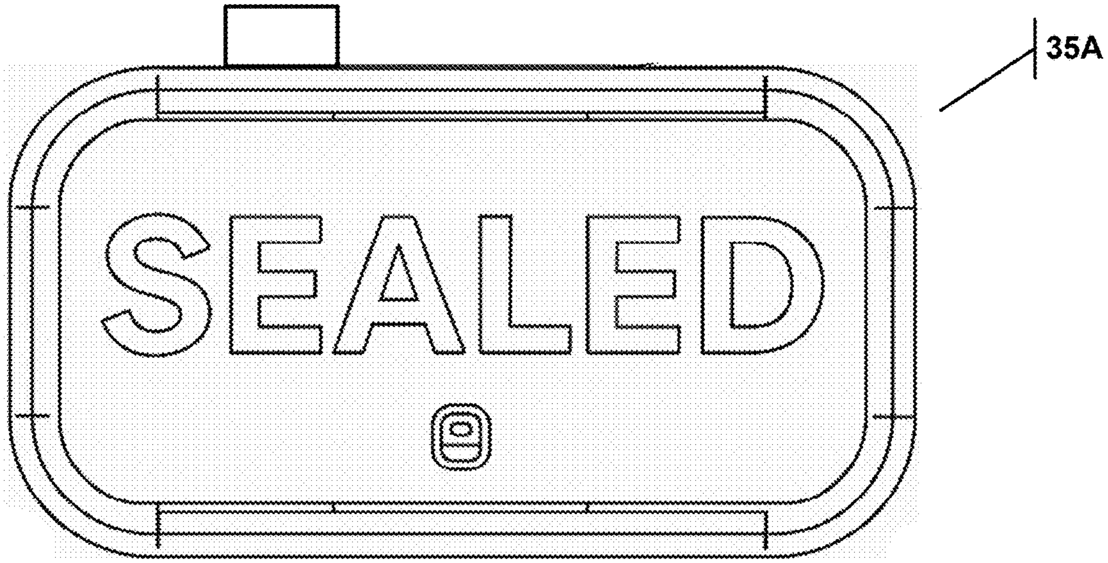
FIGS. 12A and 12B are top and bottom views of a vacuum assembly configured as a complete, self-contained module.
Figure 12B:
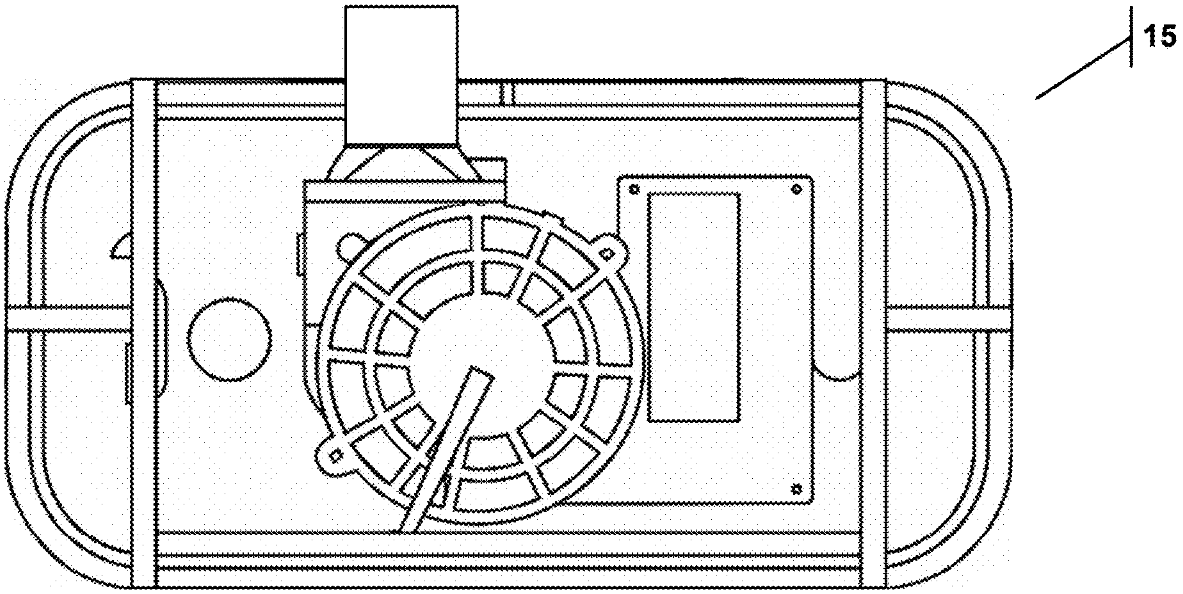
Figure 13A:
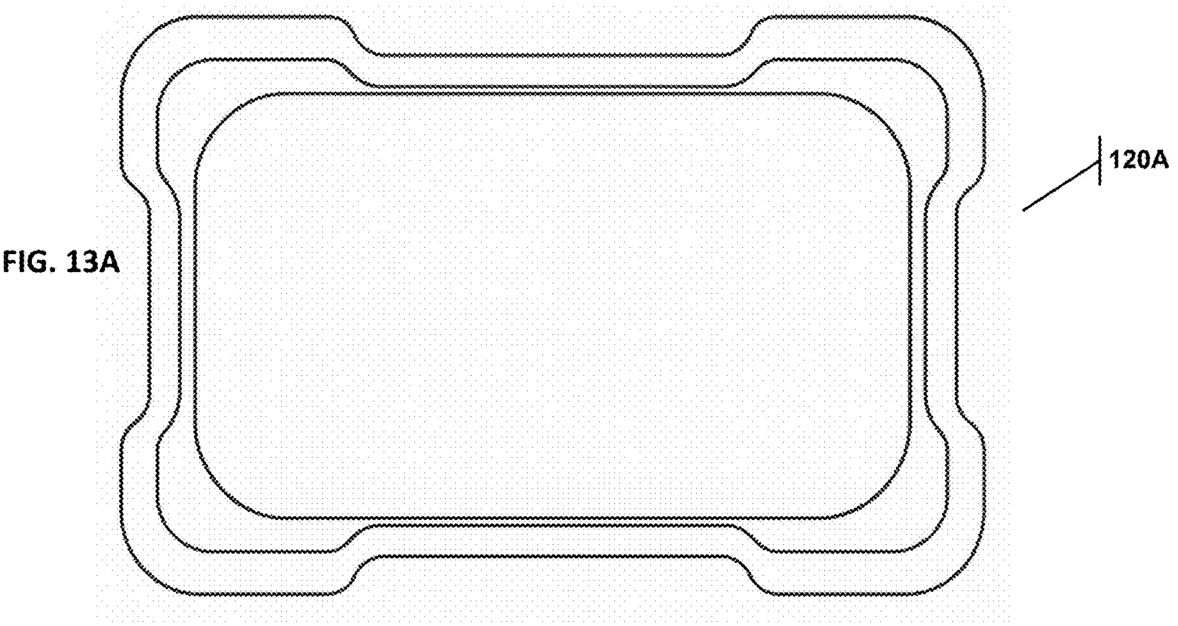
FIGS. 13A-13D illustrate adaptor variants in conjunction with the vacuum assembly of FIG. 12A.
Figure 13B:
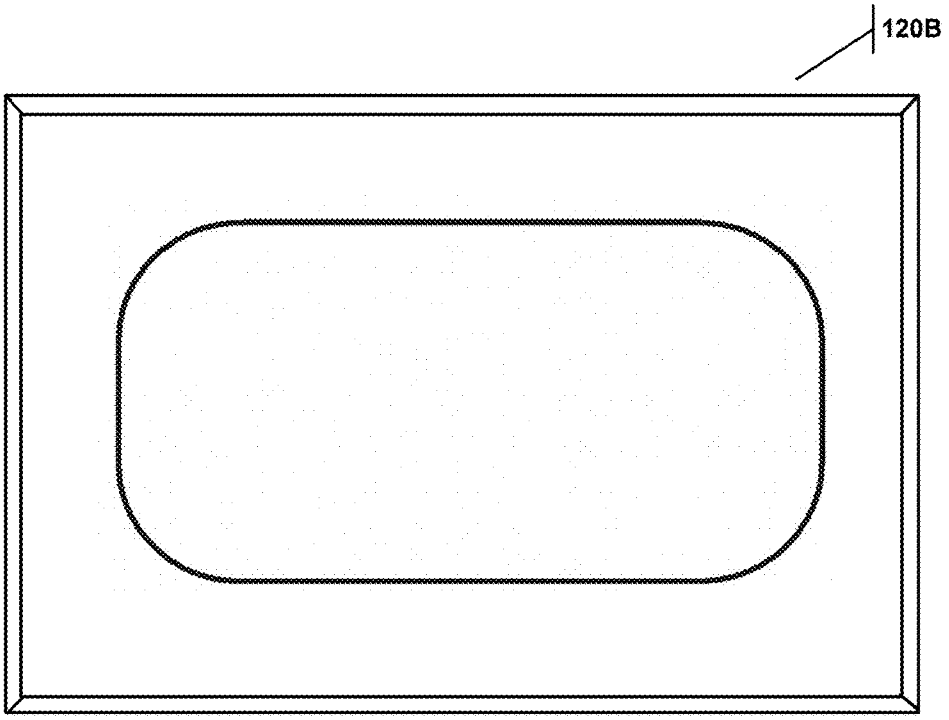
Figure 13C:
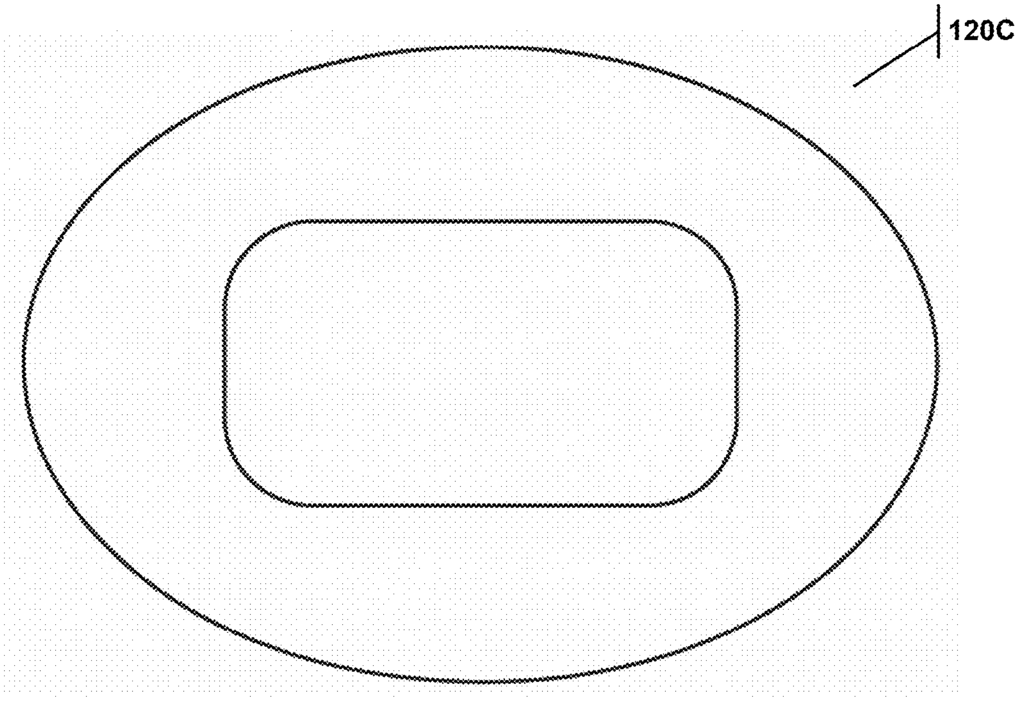
Figure 13D:
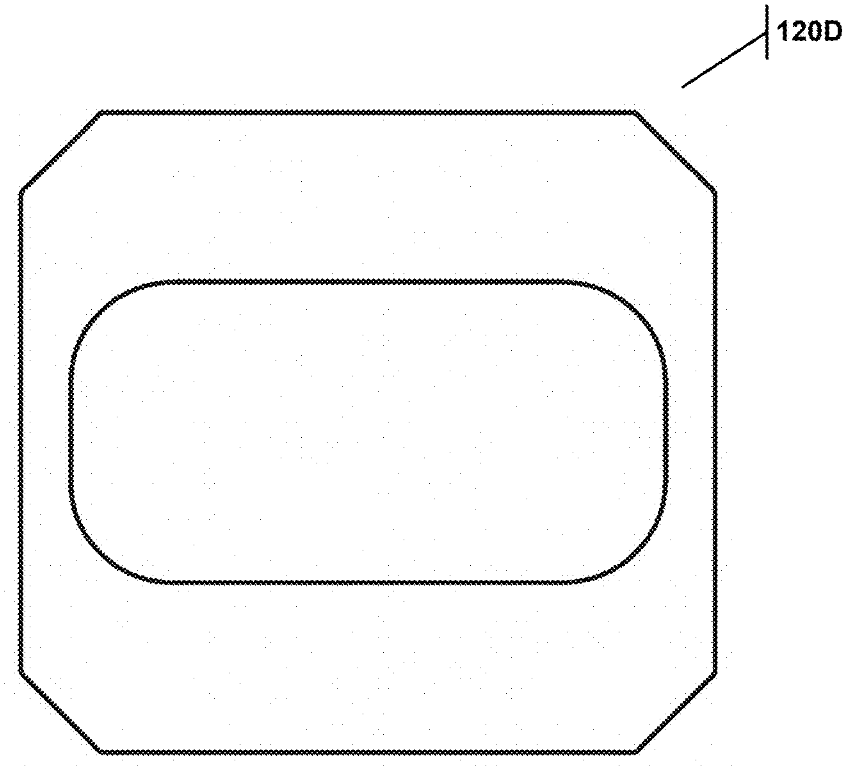

FIGS. 12A and 12B illustrate a vacuum assembly (35A) configured as a self-contained module that is detachably mountable to a plurality of interchangeable adaptors (120) sized and shaped to fit receptacles of varying geometries. As used herein, the term "adaptor" encompasses, without limitation, flanges, rings, collars, spacer plates, and other rigid or flexible mounting structures configured to allow the vacuum assembly (35A) to interface with multiple receptacle geometries. This configuration may facilitate retrofit installation into existing receptacles with minimal modification and may permit reuse of the same vacuum assembly (35A) across a variety of receptacle designs.

By way of non-limiting example, adaptor variants (120) shown in FIGS. 13A-13D correspond to a large rectangular receptacle (120B), an oval receptacle (120C), and a rectangular receptacle with cut-off corners (120D). Additional adaptor geometries may be employed to accommodate other receptacle shapes and sizes.

During use, an operator may select an adaptor (120) corresponding to a desired receptacle and employ the same vacuum assembly (35A). The assembly (35A) may be removed from one receptacle and reinstalled on another equipped with a different adaptor (120), thereby providing interchangeability and enhanced system versatility. This modular architecture may reduce manufacturing and inventory complexity by enabling production of a single vacuum assembly (35A) while tailoring only the adaptor (120) to a specific receptacle geometry.

Persons of ordinary skill in the art are aware that the use cases, structures, schematics, flow diagrams, and steps described and implied herein may be performed in any order or sub-combination without departing from the broader scope of the inventive concept disclosed herein. Every embodiment may be unique, and step(s) of method(s) may be either shortened or lengthened, overlapped with other activities, postponed, delayed, and/or continued after a time gap.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter.

As used herein, the singular forms "a," "an," and "the" include plural references unless the context clearly indicates otherwise. Thus, for example, reference to "a cable" includes a single cable as well as a bundle of two or more different cables, and the like. The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes, parameters, etc., to provide a thorough understanding of the present disclosure. The features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number±10%, such that "about 10" would include from 9 to 11. In other exemplary embodiments, the term "about" may include the recited number±X %, where X is considered the normal variation in said measurement by one of ordinary skill in the art. "Substantially identical" pieces or parts means identical other than different markings, colors, or nonfunctional aspects, if any, and identical other than normal manufacturing variations.

Although the present disclosure has been described with reference to specific exemplary embodiments, it will be evident that the various modifications and changes can be made to these embodiments without departing from the broader scope of the disclosure. Accordingly, the specification and drawings are to be regarded in an illustrative sense rather than in a restrictive sense. It will also be apparent to the skilled artisan that the embodiments described above are specific examples of a single broader disclosure which may have greater scope than any of the singular descriptions taught. There may be many alterations made in the descriptions without departing from the scope of the present innovation, which is defined solely by the claims.

The invention claimed is:

1. A trash can assembly (5) comprising:

an outer container (10);

a trash can (15) having an interior space for receiving a trash bag (7), an opening (17) for inserting trash and a bottom surface (18), wherein the opening (17) comprises a rim (16) configured to tightly hold the trash bag (7), wherein the trash can (15) nests into the outer container (10);

a vacuum assembly (35) housed within the trash can (15) comprising:

a top surface (37) positioned above the bottom surface (18) and forming a false bottom, the top surface (37) comprising an elevated portion (47);

a vacuum vent (45) located in the elevated portion (47);

a liquid gutter (40) at least partially surrounding the elevated portion (47) and configured to collect liquid from the trash bag (7);

a plenum (42) disposed beneath the top surface (37);

a vacuum motor (60) located in the plenum (42) and configured to draw air through the vacuum vent (45) into the plenum (42);

a port (65) fluidly connecting the vacuum motor (60) to the exterior of the trash can (15);

a power source (80) connected to the vacuum motor (60); and a controller (70) having a first mode configured to actuate the vacuum motor (60) to draw air from between the trash bag (7) and interior walls of the trash can (15) through the vacuum vent (45) into the plenum (42), thereby urging the trash bag (7) to conform to the interior walls.

2. The trash can assembly (5) of claim 1, wherein the top surface (37) comprises a seal indicator (50) visible through the trash bag (7) when the trash bag (7) conforms to the top surface (37).

3. The trash can assembly (5) of claim 2, wherein the seal indicator (50) is embossed or printed and is configured to provide a visual confirmation of full air evacuation.

4. The trash can assembly (5) of claim 1, wherein the controller (70) implements an auto-shutoff.

5. The trash can assembly of claim 4, wherein the auto-shutoff algorithm terminates operation when a predefined condition indicative of completed air evacuation is met, the predefined condition comprising at least one of motor-current threshold, elapsed time, pressure detection, and a touch- or proximity-sensor signal.

6. The trash can assembly (5) of claim 1, further comprising a control switch (75) operatively connected to the controller (70).

7. The trash can assembly (5) of claim 6, wherein the control switch (75) is wireless and operates via a low-power communication protocol.

8. The trash can assembly (5) of claim 1, wherein the vacuum assembly (35) comprises a status indicator (55) connected to the controller (70) that provides the status of the trash can assembly (5), wherein the status indicator (55) is selected from the group consisting of an LED visible through the trash bag (7) and a speaker configured to emit a completion sound.

9. The trash can assembly (5) of claim 1, wherein at least one of (i) the top surface (37) and (ii) a region surrounding the vacuum vent (45) includes a hydrophobic or oleophobic coating.

10. The trash can assembly (5) of claim 1, wherein the controller (70) has a second mode configured to actuate the vacuum motor (60) to force air from the plenum (42) through the vacuum vent (45) into the interior of the trash bag (7) to inflate the trash bag (7).

11. The trash can assembly (5) of claim 10, further comprising a demonstration mode, wherein the controller (70) alternates between the first mode and the second mode.

12. The trash can assembly (5) of claim 1, wherein the vacuum motor (60) comprises a variable-speed centrifugal blower fan and the controller (70) is configured to adjust blower speed based on at least one of sensed motor current, pressure differential, or airflow resistance.

13. The trash can assembly (5) of claim 1, wherein the vacuum vent (45) comprises a perimeter evacuation system including a plurality of slits disposed around a perimeter of the top surface (37) and oriented vertically or at an angle to direct airflow from edges toward a center of the top surface (37).

14. The trash can assembly (5) of claim 1, further comprising at least one moisture sensor (41) positioned proximate to the vacuum vent (45).

15. The trash can assembly (5) of claim 1, further comprising a user interface coupled to the controller (70) including at least one of a touch-sensitive panel, a mechanical button, or a display to select evacuation modes and suction strength and to present status information.

16. The trash can assembly (5) of claim 1, further comprising connectivity features enabling integration with a smart home system or a mobile application for at least one of remote activation, status reporting, customization of settings, or notifications that the trash bag (7) requires replacement.

17. The trash can assembly (5) of claim 1, further comprising an odor control system including at least one of an activated carbon filter, an enzymatic treatment, or a scent-releasing mechanism.

18. The trash can assembly (5) of claim 1, comprising a failsafe button (57) on the vacuum assembly (35) wherein actuating the failsafe button (57) causes the controller (70) to perform at least one of: (i) transmit a status report; and (ii) activate the vacuum motor (60).

19. The trash can assembly (5) of claim 1, wherein insertion of the trash can (15) into the outer container (10) mechanically engages a detachable electrical connection (90A, 90B) to establish electrical coupling without manual cabling.

20. The trash can assembly (5) of claim 1, further comprising a detachable electrical connection (90A, 90B) to facilitate power or signal transmission between the outer container (10) and trash can (15).

21. The trash can assembly (5) of claim 20, wherein the detachable electrical connection (90A, 90B) is selected from a group consisting of: a pogo pin and pad assembly, a magnetic connector, and waterproof terminal blocks.

22. The trash can assembly (5) of claim 20, wherein at least the power source (80) is housed in the outer container (10), and electrically connected to the vacuum motor (60) via the detachable electrical connection (90A, 90B).

23. The trash can assembly (5) of claim 20, wherein at least the controller (70) is housed in the outer container (10), and electrically connected to the vacuum motor (60) via the detachable electrical connection (90A, 90B).

24. A method for operating a trash can (15) comprising:

placing a trash bag (7) within the trash can (15) having an interior space and a vacuum assembly (35), wherein the vacuum assembly comprises a vacuum vent (45) and a vacuum motor (60) located in a plenum (42);

activating the vacuum motor (60) via a control switch (75);

drawing air from between the trash bag (7) and the interior walls of the trash can (15) through the vacuum vent (45) into the plenum (42);

automatically deactivating the vacuum motor (60) when a predefined condition is met, based on current draw by the vacuum motor (60).

25. The method of claim 24, further comprising emitting an audio signal or visual cue upon deactivation.

26. The method of claim 24, wherein the vacuum assembly further comprises a controller (70), the method further comprising wirelessly receiving, at the controller (70), a command from a mobile application integrated with a smart home system to activate the vacuum motor (60) and to transmit status information.

27. The method of claim 24, further comprising cycling between a second mode in which the trash bag (7) is inflated and the first mode in which air is evacuated to conform the trash bag (7) to the trash can (15).

28. The method of claim 24, further comprising varying a speed of the vacuum motor (60) responsive to at least one of sensed motor current, pressure differential, or airflow resistance.

29. A device for evacuating air from a trash can, comprising:

a self-contained vacuum assembly (35A) including:

a housing having a top surface (37);

a vacuum vent (45) formed in the top surface (37);

a plenum (42) positioned beneath the top surface (37) and in fluid communication with the vacuum vent (45);

a vacuum motor (60) disposed within the plenum (42) and operable to draw air through the vacuum vent (45) into the plenum (42);

a discharge port (65) in fluid communication with the vacuum motor (60) and configured to vent air to an exterior of the trash can (15);

a power source (80) electrically coupled to the vacuum motor (60); and a controller (70) configured, in a first mode, to actuate the vacuum motor (60) to draw air from a region between a trash bag (7) and interior walls of the trash can (15) through the vacuum vent (45) and into the plenum (42), thereby urging the trash bag (7) to conform to the interior walls; and a set of interchangeable adaptors (120A-120D) each configured to surround the top surface (37) and removably attach to the self-contained vacuum assembly (35A), each adaptor being shaped to match a geometry of a different trash can (15).

* * * * *